United States Patent
Lin

(10) Patent No.: US 8,760,556 B2
(45) Date of Patent: Jun. 24, 2014

(54) IMAGE CAPTURE APPARATUS WITH VARIABLE TRANSLUCENCY MIRROR

(75) Inventor: Andy Lai Lin, Parisppany, NJ (US)

(73) Assignee: Canon Kabushiki Kaisha, Tokyo (JP)

( * ) Notice: Subject to any disclaimer, the term of this patent is extended or adjusted under 35 U.S.C. 154(b) by 338 days.

(21) Appl. No.: 13/175,226

(22) Filed: Jul. 1, 2011

(65) Prior Publication Data

US 2013/0002925 A1 Jan. 3, 2013

(51) Int. Cl.
H04N 5/222 (2006.01)
(52) U.S. Cl.
USPC ............. 348/333.08; 348/333.01; 348/335; 348/341; 348/344; 396/354; 396/385; 396/373; 396/447
(58) Field of Classification Search
USPC ............. 348/333.08, 333.01, 335, 341, 344; 396/354, 385, 373, 447
See application file for complete search history.

(56) References Cited

U.S. PATENT DOCUMENTS

| | | | |
|---|---|---|---|
| 4,118,718 A | 10/1978 | Hahn et al. | |
| 4,122,468 A | 10/1978 | Fukuhara | |
| 4,912,500 A | 3/1990 | Yokota | |
| 4,952,966 A | 8/1990 | Ishida et al. | |
| 5,581,318 A | 12/1996 | Shiratori | |
| 5,589,909 A | 12/1996 | Kusaka | |
| 7,684,105 B2 | 3/2010 | Lamontagne et al. | |
| 7,847,853 B2 | 12/2010 | Suda | |
| 2004/0047050 A1 | 3/2004 | Bauer et al. | |
| 2006/0196613 A1 | 9/2006 | Lamontagne et al. | |
| 2008/0316353 A1 * | 12/2008 | Suda | 348/349 |
| 2010/0045853 A1 | 2/2010 | Murashima | |
| 2010/0165176 A1 | 7/2010 | Taniguchi | |

FOREIGN PATENT DOCUMENTS

JP 2009180822 A * 8/2009

OTHER PUBLICATIONS

Wikipedia, Smart glass, Printed Mar. 4, 2011 http://en.wikipedia.org/wiki/Smart_glass.
Melanson, Canon patent application offers solution for Live View autofocus issue, Feb. 22, 2009, http://www.engadget.com/2009/02/11/canon-patent-application-offers-soluation-for-live-vie . . . .
Deb, Photovoltaic-Integrated Electrochromic Device for Smart-Window Applications, NREL, May 2000, pp. 1-9.

* cited by examiner

Primary Examiner — Antoinette Spinks
(74) Attorney, Agent, or Firm — Canon U.S.A., Inc., IP Division

(57) ABSTRACT

An image capture apparatus includes a variable translucency mirror, a viewfinder unit configured to receive light reflected by the variable translucency mirror, an imaging sensor configured to receive light transmitted through the variable translucency mirror, an image display unit configured to display an image based on the light received by the imaging sensor, and a controller configured to set a translucency of the variable translucency mirror. In a viewfinder mode, the controller sets the variable translucency mirror to be at least partially reflective such that light incident on the variable translucency mirror is reflected thereby and received by the viewfinder unit. In a display view mode, the controller sets the variable translucency mirror to be at least partially transparent, such that light incident on the variable translucency mirror is transmitted therethrough and received by the imaging sensor.

24 Claims, 14 Drawing Sheets

IMAGE CAPTURE APPARATUS WITH VARIABLE TRANSLUCENCY MIRROR

BACKGROUND OF THE INVENTION

1. Field of the Invention

Aspects of the present invention generally relate to an image capture apparatus having a variable translucency mirror.

2. Description of the Related Art

Digital single-lens reflex cameras (DSLR cameras) have become increasingly popular among photographers as a high-quality camera option, due to their many advantageous characteristics. In a typical DSLR camera, light received by the camera lens is directed via a mirror to an optical viewfinder, allowing the user to compose and even focus an image for photographing using the main optics of the camera. Many high-end DSLR cameras also provide higher quality and larger image sensors as compared to compact cameras, and may also provide several other professional grade-type options, such as the ability to select from among a variety of interchangeable lenses.

Yet another advantage of certain conventional DSLR cameras is their ability to provide relatively quick focus of an image for capturing. One of the techniques used in DSLR cameras to provide rapid focusing is phase-detection autofocus. Phase-detection autofocus generally involves receiving light rays from different parts of the lens, and comparing the images from the light rays to determine a phase difference therebetween. An advantage of this technique is that it provides for the determination of not only whether an image is out of focus, but also the direction and the extent to which the image is out of focus. Focus correction measures can thus be rapidly implemented using this information, such as by adjusting the focal length of the lens in a direction and amount calculated for correction of the phase difference. In certain DSLR cameras, phase-detection autofocus is facilitated by providing a mirror in the camera that reflects incoming light rays simultaneously towards both a viewfinder and phase-detection autofocus sensors. When a picture is taken, the mirror is "flipped up" or otherwise moved out of the path of the incoming light, thereby allowing a sufficient amount of light to fall on the image sensor. Examples of phase-detection autofocus techniques are described in U.S. Pat. No. 5,589,909 to Kusaka and U.S. Pat. No. 4,952,966 to Ishida et al, both of which are incorporated by reference herein in their entireties.

Recently, newer DSLR cameras incorporate a "Live View" feature, in which a display image is generated from light received by the image sensor, and this image is displayed to a user of the camera, generally on an LCD or other display screen built into the camera body. The "Live View" mode can be advantageous in that the displayed image provides a preview of the exposure of the photograph to the user. However, DSLR cameras having such "Live View" modes have the disadvantage in that phase-detection autofocus cannot be performed at the same time. This is because any mirrors or other objects that would block or otherwise re-direct light away from the image sensor are typically moved out of the light path during the "Live View" mode, such that the amount of light received by the image sensor is sufficient for the image display. This includes any mirrors employed in the camera to re-direct light towards phase-detection sensors. Accordingly, phase-detection autofocus correction is not operable in the "Live View" mode, because the phase-detection sensors do not receive the light necessary to perform phase-detection autofocus.

Instead, cameras having such "Live View" modes often utilize an alternative method for autofocus correction, generally referred to as contrast detection autofocus. In contrast detection autofocus, the light received by the image sensor itself can be used to determine a position of a lens that provides the greatest contrast, signifying that the image is in focus. However, a problem with the contrast detection autofocus is that it can be slow when compared to phase-detection autofocus techniques. This is because, while the contrast detection autofocus technique is capable of determining whether an image out of focus, the technique typically does not provide information on the direction or extent to which the image is out of focus. Thus, trial and error methods are used in arriving at the proper focus parameters, such as by moving the lens back and forth to evaluate the contrast at different lens positions. The contrast detection autofocus method may also be especially slow in DSLR cameras, because such cameras can have a depth of field that is shallower than compact (non-DSLR) cameras, and DSLR cameras may also have a relatively larger lens that does not allow for changing of the focal length as quickly. Furthermore, the data processing involved in contrast detection autofocus is typically more exhaustive than that required by phase-detection autofocus, making the processing for the contrast detection autofocus slow in comparison.

In an attempt to resolve such issues, a number of different solutions have been proposed. As an example of such a proposed solution, the FUJIFILM F300 EXR compact camera implements a phase-detection autofocus technique that uses micro-lenses and half-pixel masks on the image sensor. The micro-lenses and half-pixel masks help to separate and distinguish light coming from the left and right sides of the lens, thereby allowing for the phase-detection autofocus using the light received by the masked pixels.

However, a problem with implementing this technique is that the micro-lenses and half-pixel masks can reduce by half the amount of light detected by these pixels, thereby reducing the signal-to-noise ratio (SNR). While image processing can be performed to improve the appearance of the resulting image, the noise nonetheless becomes apparent in low-light conditions that typically amplify such noise. Furthermore, the artificial positions of the half-masked pixels can make the noise look artificial when amplified. Such additional noise can be deemed unacceptable to users of high-end cameras and DSLR cameras where high image quality is desired. Also, the micro lens and half-mask technique used in the FUJIFILM 300 EXR is intended for use in compact cameras, and has not been used in DSLR cameras having optical viewfinder capabilities.

Yet another example of a proposed solution is the SONY A55V, which uses a fixed translucent mirror that directs 30% of incident light to a phase-detection sensor, and allows 70% of the light to pass therethrough to an imaging sensor. Since the translucent mirror allows light to hit both the image sensor and the phase-detection sensor, phase-detection autofocus correction to be performed simultaneously with use of the "Live View" mode. Furthermore, since the translucent mirror allows for a majority of the light to pass therethrough to the image sensor, the camera can be operated with the translucent mirror remaining fixed in position while image capture is performed, without requiring the mirror to move out of the path of incident light.

Along these lines, fixed pellicle mirrors (half-silvered mirrors) have also been employed in SLR film cameras as semi-transparent mirrors that split the incident light beam into a beam directed towards the image sensor and a beam directed towards the autofocus and metering sensors.

However, a problem with such fixed translucent and/or semi-transparent mirrors, as in the SONY A55V, is that by directing a part of the light towards the phase-detection sensor, the amount of light that is received by the image sensor for capturing the image is inevitably reduced. Thus, while the SONY A55V may be capable of providing for phase-detection autofocus in a "Live View" mode, it also suffers from a reduction in the total amount of light that reaches the image sensor. This deficit in available light can be significant, especially in low light conditions where photographers typically seek to use as much available light as possible to produce relatively noise-free images. While a user can increase the exposure time to attempt to compensate for this light deficit, lengthy exposure times can cause blurring of the resulting pictures. The SONY A55V also does not provide for the option of using an optical viewfinder, which is highly desired by certain users, and instead only allows for previewing of an image via the "Live View" mode, similar to a compact camera.

One attempt to address the problem of light deficit during image capture involves providing a translucent mirror that it is movable within the camera body, such that during image capture, the translucent mirror moves upwards and out of the light pathway, thereby allowing the image sensor to capture the full amount of available light. This operation can be similar to the "flipping up" of the fully reflective mirrors used in conventional DSLR cameras, as discussed above. An example of such a movable translucent mirror is described in U.S. Patent Application Publication No. 2010/0045853 to Murashima, which is herein incorporated by reference in its entirety.

Nonetheless, a problem that remains with cameras having translucent mirrors is that they do not use standard optical viewfinders, and instead substitute with electronic viewfinders (EVFs). This is because the translucent mirror allows only a fraction of the light to be directed away from the image sensor. If a standard optical viewfinder were provided in place of the electronic viewfinder, the image viewable therethrough would be excessively dark and unusable, due the deficiency in the amount of light directed towards the viewfinder. Also, since the autofocus sensors are in the path of any light redirected from the image sensor, their presence would also affect the amount of light received by an optical viewfinder.

Furthermore, EVFs are typically not preferred over standard optical viewfinders by many photographers, because of the problems they can pose. For example, EVFs tend to display an excessive amount of noise in low-light conditions, and the resolution of EVFs also typically do not match that of standard optical viewfinders. Also, as EVFs often use field sequential LCDs to increase the viewfinder resolution, R, G and B signals may be displayed one after another rather than simultaneously in a single pixel, leading the EVFs to display rainbow artifacts, which can be a substantial drawback in their use.

Accordingly, there remains a need for an image capture apparatus and method that allows a user to preview an image by either using an optical viewfinder or by displaying the image on a display ("Live View"), while providing good autofocus correction. There is further a need for an image capture apparatus and method that provides for phase-detection autofocus correction both in a case where the image is previewed using an optical viewfinder, as well as in a case where the image is previewed by displaying the image on a display ("Live View"). There is further a need for an image capture apparatus and method that provides phase-detection autofocus of an image without excessively reducing the amount of light available for image preview and/or image capture.

SUMMARY OF THE INVENTION

According to one aspect of the invention, an image capture apparatus includes a variable translucency mirror, a viewfinder unit configured to receive light reflected by the variable translucency mirror, an imaging sensor configured to receive light transmitted through the variable translucency mirror, an image display unit configured to display an image based on the light received by the imaging sensor, and a controller configured to set a translucency of the variable translucency mirror. In a viewfinder mode, the controller sets the variable translucency mirror to be at least partially reflective such that light incident on the variable translucency mirror is reflected thereby and received by the viewfinder unit. In a display view mode, the controller sets the variable translucency mirror to be at least partially transparent, such that light incident on the variable translucency mirror is transmitted therethrough and received by the imaging sensor.

According to another aspect of the invention, a mirror for an image capture apparatus includes a main mirror portion, and a plurality of mirror windows disposed in the main mirror portion. At least one of the main mirror portion and the plurality of mirror windows includes a variable translucency member, the variable translucency member having a translucency that is variably set to provide predetermined transmittance and reflectance of light incident thereon.

According to yet another aspect of the invention, an image capture apparatus includes a variable translucency mirror having one or more mirror windows therein, a viewfinder unit configured to receive light reflected by the variable translucency mirror, an imaging sensor configured to receive light transmitted through the variable translucency mirror, one or more focus adjustment mirrors configured to receive light transmitted through the one or more mirror windows of the variable translucency mirror window, one or more focus adjustment sensors configured to receive light reflected by the one or more focus adjustment mirrors, an image display unit configured to display an image based on the light received by the imaging sensor, a focus adjustment determination unit configured to determine a focus adjustment based on the light received by the one or more focus adjustment sensors, and a controller configured to set a translucency of the variable translucency mirror. In a viewfinder mode, the controller sets the variable translucency mirror to be at least partially reflective such that light incident on the variable translucency mirror is reflected thereby and received by the viewfinder unit. In a display view mode, the controller sets the variable translucency mirror to be at least partially transparent, such that light incident on the variable translucency mirror is transmitted therethrough and received by the imaging sensor.

DESCRIPTION OF THE EMBODIMENTS

The following description is of certain illustrative embodiments, and the disclosure is not limited to these embodiments, but includes alternatives, equivalents, and modifications such as are included within the scope of the claims. Additionally, the illustrative embodiments may include several novel features, and a particular feature may not be essential to practice the systems and methods described herein Embodiments of the present invention provide for an image capture apparatus 100 and method using a variable translucency mirror 110 that provides variable levels of reflectance and/or transmittance of light incident thereon. The translucency of the mirror 110 can be controlled to provide a predetermined reflectance and/or transmittance of light incident thereon, such as in accordance with a selected mode and/or autofocus operation, to facilitate the capturing of images therewith.

Figure 1:
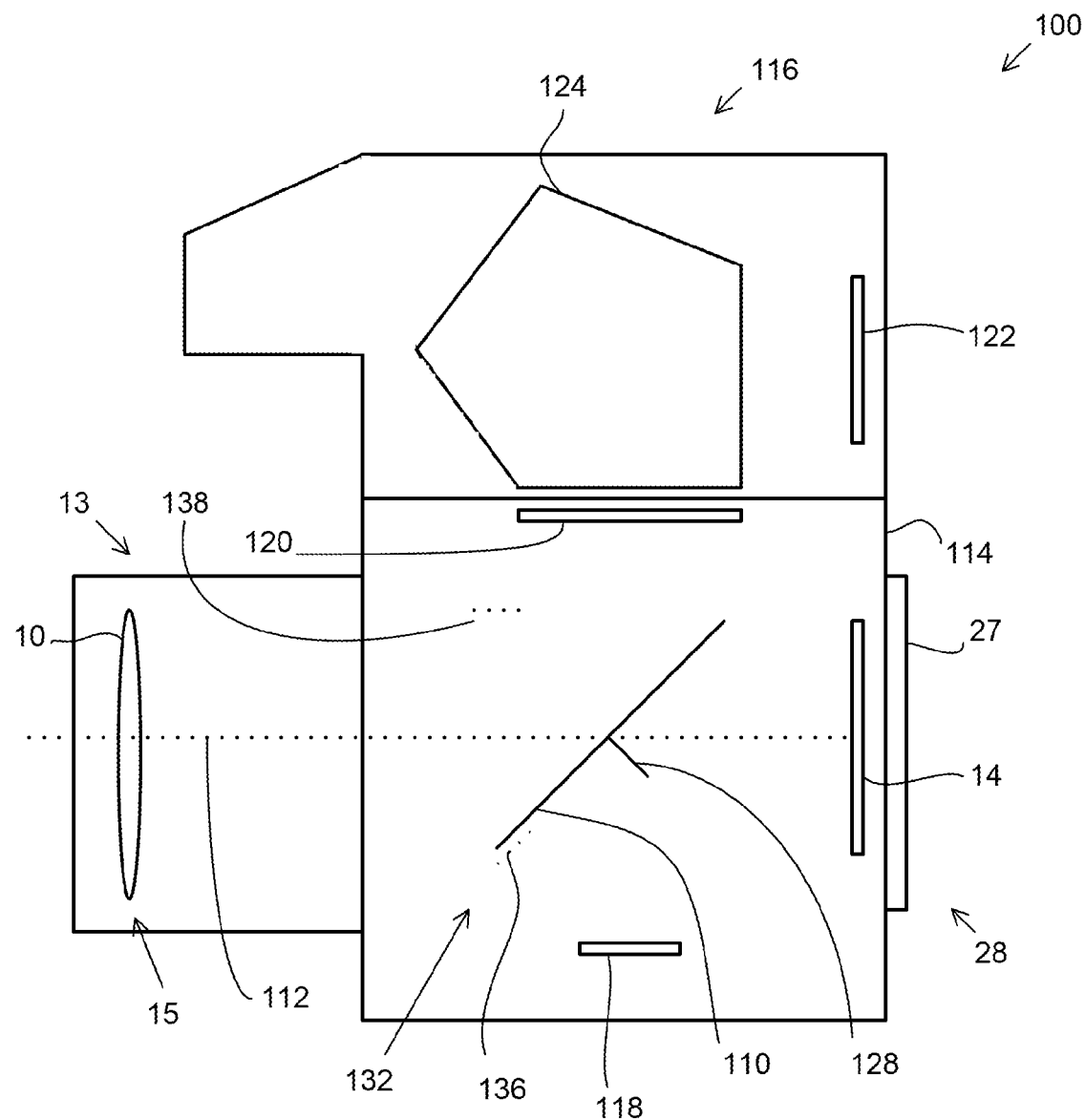
FIG. 1 is a sectional side view of an image capture apparatus having a variable translucency mirror, according to an embodiment of the invention.

FIG. 1 depicts an image capture apparatus 100 having a variable translucency mirror 110, according to an embodiment of the invention. The image capture apparatus 100 may operate as a digital single-lens reflex camera (DSLR camera), although aspects of the invention are not limited to this type of camera. An embodiment of a DSLR camera, components and/or features of which may be suitable for use in accordance with aspects of the invention, is described in U.S. Pat. No. 7,847,853 to Yasuo Suda, which is hereby incorporated by reference herein in its entirety.

In the embodiment of the image capture apparatus 100 as shown, the image capture apparatus 100 comprises an apparatus body 114 in which various structures and/or members are placed to facilitate image capture, as described in further detail below. The image capture apparatus 100 further comprises a lens apparatus 13 having an image forming optical system 15 therein that includes one or more lenses 10 for receiving light rays from an object and/or scene. The lens apparatus 13 can be detachably mounted to the apparatus body 114, to allow for interchangeability of a plurality of lens apparatuses 13 that provide various different angles of view, among other features.

The light received through the image forming optical system 15 of the lens apparatus 13 travels along an optical axis 112 of the image capture apparatus 100 to an interior of the apparatus body 114. An imaging sensor 14 such as a CCD or CMOS is positioned within the interior of the image capture apparatus 100, such that light received from the optical system 15 is allowed to fall thereon during image capture, e.g., in response to depression of a shutter switch 64. For an imaging sensor 14 of the area type, such as a CCD or CMOS, the imaging sensor 14 detects the amount of light incident thereon (e.g., the number of photons incident on the sensor 14), and converts the detected light amount into an electrical signal indicating the amount of light received for each pixel in the imaging sensor 14. The imaging sensor 14 may be capable of generating signals corresponding to at least one of a still image and a moving image of the object, which signals can be processed and/or stored in a memory of the image capture apparatus 100.

The embodiment of the image capture apparatus 100 as shown in FIG. 1 further comprises a viewfinder unit 116. The viewfinder unit 116 comprises an optical viewfinder that allows a user to view and compose an image using the main optics of the image capture apparatus 100. In the embodiment of the viewfinder unit 116 as shown, the viewfinder unit 116 comprises a viewfinder lens or eyepiece 122 through which the user can view the image for image capture. The viewfinder unit 116 as shown also comprises a pentaprism 124 that receives light diverted from the main optical axis 112 of the image capture apparatus 100, and re-directs the light to the viewfinder lens 122 while giving the proper handedness to the image, and further comprises a focusing screen 120 to focus the diverted light onto the pentaprism 124.

The image capture apparatus 100 further comprises an image display unit 28 configured to display an image based on the light received by the imaging sensor 14. The image display unit 28 is configured to receive a signal corresponding to the light detected by the imaging sensor 14, and provide a display of the image in response to the signal, thereby allowing a user to observe the image detected by the imaging sensor 14. In the embodiment as shown in FIG. 1, the image display unit 28 comprises a display 27 configured to display the image thereon (e.g., an LCD display, an LED display, an OLED display, a plasma display, a CRT display), that is built-in or otherwise mounted on a back side of the body 114 of the image capture apparatus 100. The image display unit 28 may also continuously update the display of the image over a period of time, to provide a real-time or "live" view of the image.

Figure 8:
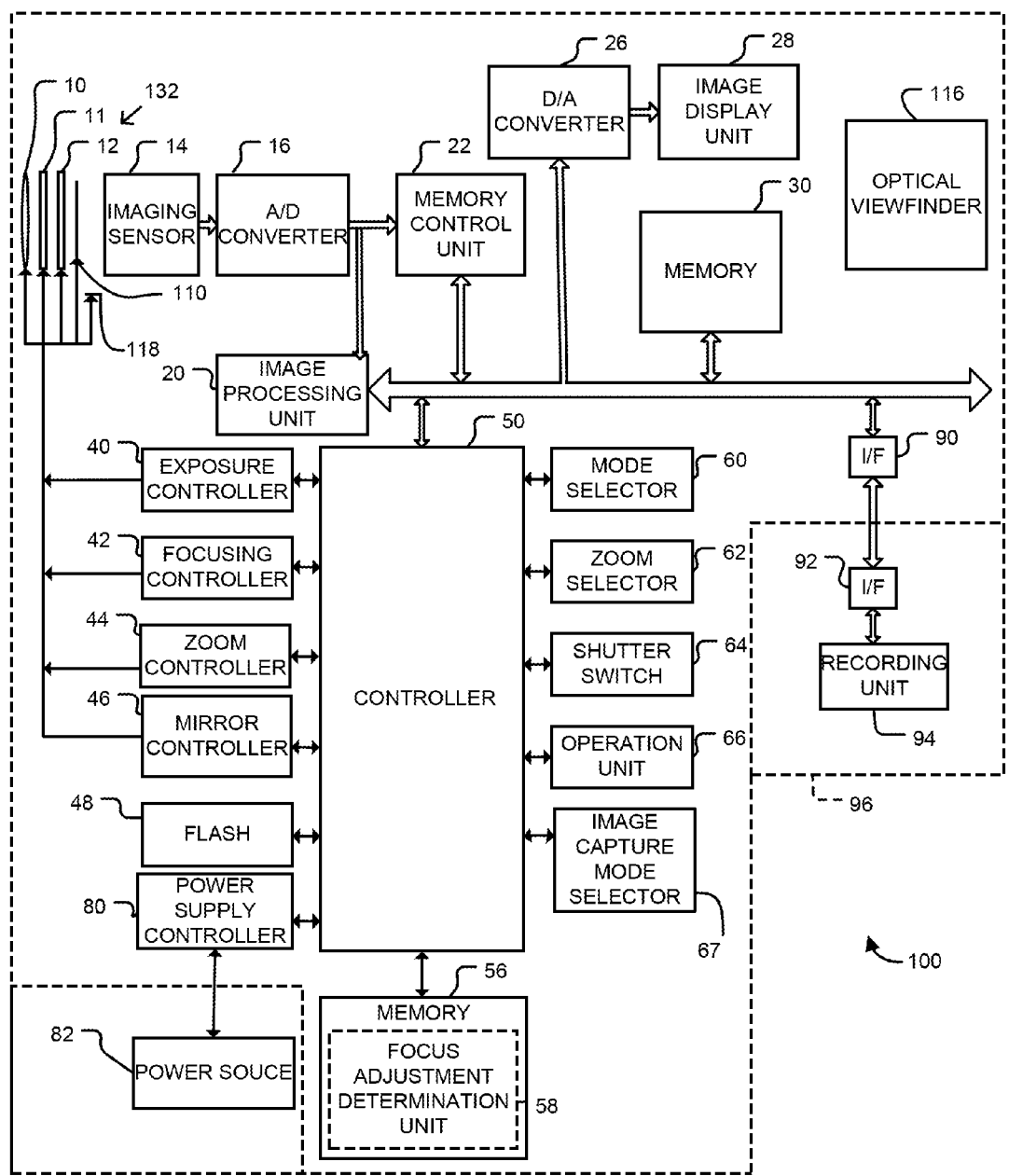
FIG. 8 is a schematic view of the image capture apparatus of FIG. 1 having a controller, according to embodiments of the invention.

According to one aspect, the image capture apparatus 100 comprises a viewing mode changeover selector 60 that allows a user to select between a viewfinder mode and a display view mode for operation of the image capture apparatus 100, an embodiment of which is shown in FIG. 8. The viewfinder mode is a mode that allows the user to operate the viewfinder unit 116 to view and compose an image for capture. The display view mode is a mode that allows the user to operate the image display unit 28 to view and compose the image prior for image capture, e.g., a "live view" mode. By switching the viewing mode changeover selector 60 from one mode to another, the settings of the image capture apparatus 100 are changed to settings that have been predetermined for the selected mode. For example, in selecting the viewfinder mode, the settings of the image capture apparatus 100 are set to allow for operation of the viewfinder unit 116, whereas in selecting the display view mode, the settings of the image capture apparatus 100 are set to allow for operation of the image display unit 28. The mode changeover selector 60 may also allow for switching to a mode other than the viewfinder and display view modes, such as for example an image playback or reproduction mode. The mode changeover selector 60 may comprise for example a switch or a knob on the body 114 of the image capture apparatus, or a menu option displayed by the image display unit 28, among other types of selectors.

In the embodiment as shown in FIG. 1, the image capture apparatus 100 comprises a variable translucency mirror 110 within the body 114 of the image capture apparatus 100. The variable translucency mirror 110 can be positioned behind the lens apparatus 13 and in front of the imaging sensor 14, along the optical axis 112 of the image capture apparatus 100, such that light received from the lens apparatus 13 is incident on the variable translucency mirror 110. The translucency of the variable translucency mirror 110 can be controlled to provide different levels of reflectance and/or transmittance of light incident on the mirror 110. For example, the translucency can be controlled to provide a mirror 110 having a higher reflectance, or to provide a mirror 110 having a higher transmittance of light incident thereon. The level of reflectance is generally inversely proportionate to the level of transmittance of the light incident on the mirror, such that controlling the translucency to provide higher levels of reflectance generally results in lower levels of transmittance, and controlling the translucency to provide higher levels of transmittance generally results in lower levels of reflectance.

According to one aspect of the invention, the translucency of the mirror 110 can be controlled to set the mirror 110 to be fully reflective, such that substantially the entire light incident on the mirror 110 is reflected thereby. According to yet another aspect of the invention, the translucency of the mirror 110 can be controlled to set the mirror 110 to be fully transparent, such that substantially the entire light incident on the mirror 110 passes therethough. In another aspect of the invention, the translucency of the mirror 110 can be controlled to set the mirror at different intermediate levels of reflectance/transmittance, such that the mirror 110 is at least partially reflective while simultaneously also being at least partially transparent to light incident thereon. Intermediate translucency levels that provide both reflectance and transmittance may also be selected to control the fraction of incident light that is reflected versus transmitted, such as for example to provide relatively more reflectance than transmittance, to provide relatively more transmittance than reflectance, or to provide substantially equivalent amounts of reflectance and transmittance of the light incident on the mirror 110. By controlling the level of reflectance/transmittance set for the variable translucency mirror 110, the fraction of incident light passing through/reflected by the mirror 110 can be controlled to impart enhanced functionality to the image capture apparatus 100.

According to one aspect, the image capture apparatus 100 comprises a controller 50 configured to set the translucency level of the variable translucency mirror 110, an embodiment of which is shown in FIG. 8. The controller 50 is configured to provide a signal, such as an electrical signal, that sets the translucency of the mirror 110 at a predetermined level, such as fully reflective, fully transparent, or at an intermediate translucency level. The controller 50 may also provide a first signal to set a first translucency level, and in the case where a different translucency level is selected to be set, the controller 50 provides a second signal to change the translucency level from the first level to a second level. The controller 50 may comprise, e.g., one or more processors (microprocessors) that read and perform computer-executable instructions, as described further below.

According to one aspect of the invention, the translucency of the variable translucency mirror 110 can be set according to a selected mode of the image capture apparatus 100, to provide a translucency that is suitable for that mode. That is, the translucency of the mirror 110 may be set according to whether the image capture apparatus 100 has been placed in a mode such as the viewfinder mode or the display view mode, and even other modes such as an image capture mode. The translucency level of the variable translucency mirror 110 can be set according to a signal from the controller 50 to set the translucency level at a predetermined level according to the selected mode.

Figure 2:
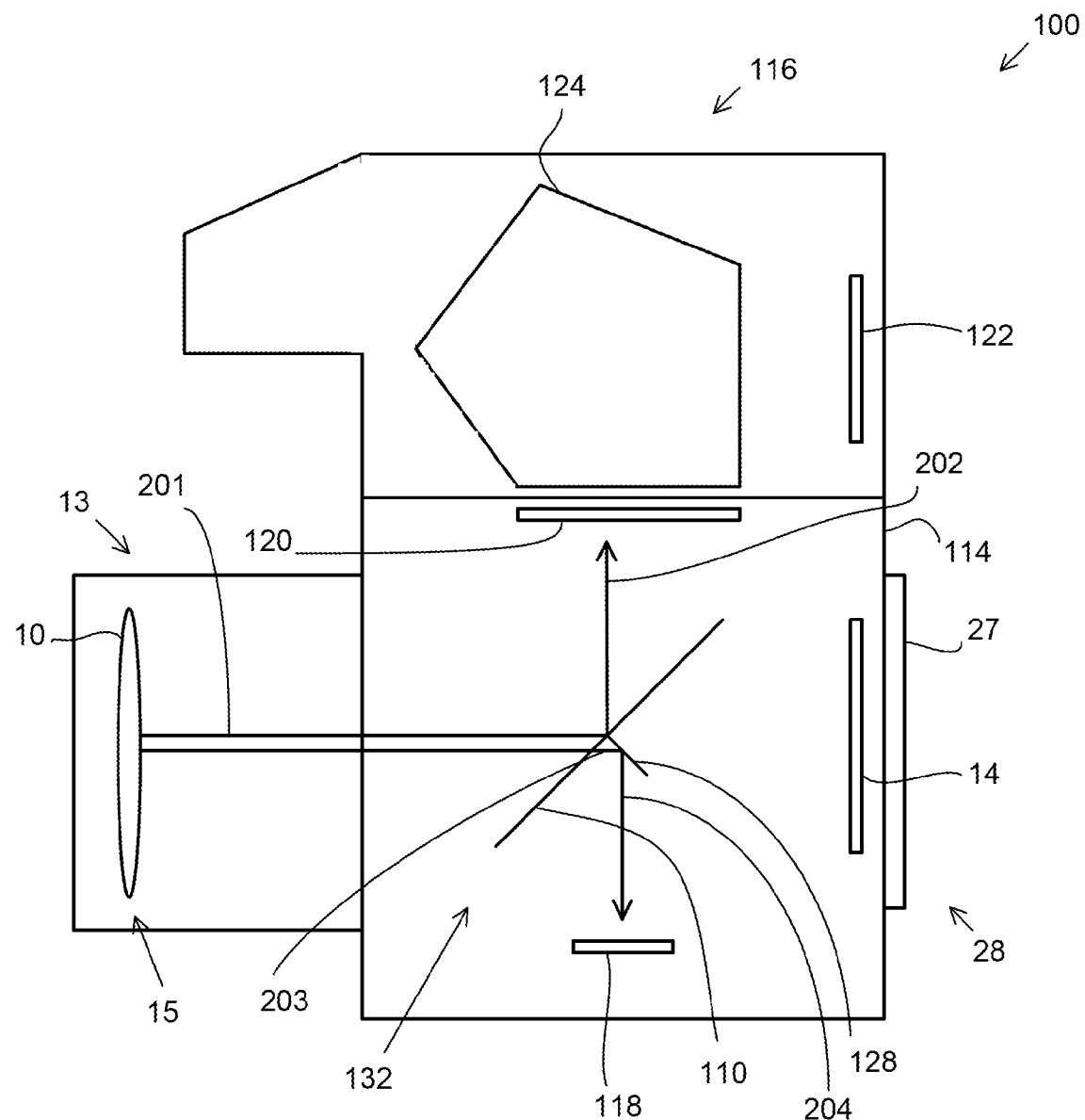
FIG. 2 is a sectional side view of the image capture apparatus of FIG. 1 in a viewfinder mode, according to an embodiment of the invention.
Figure 3:
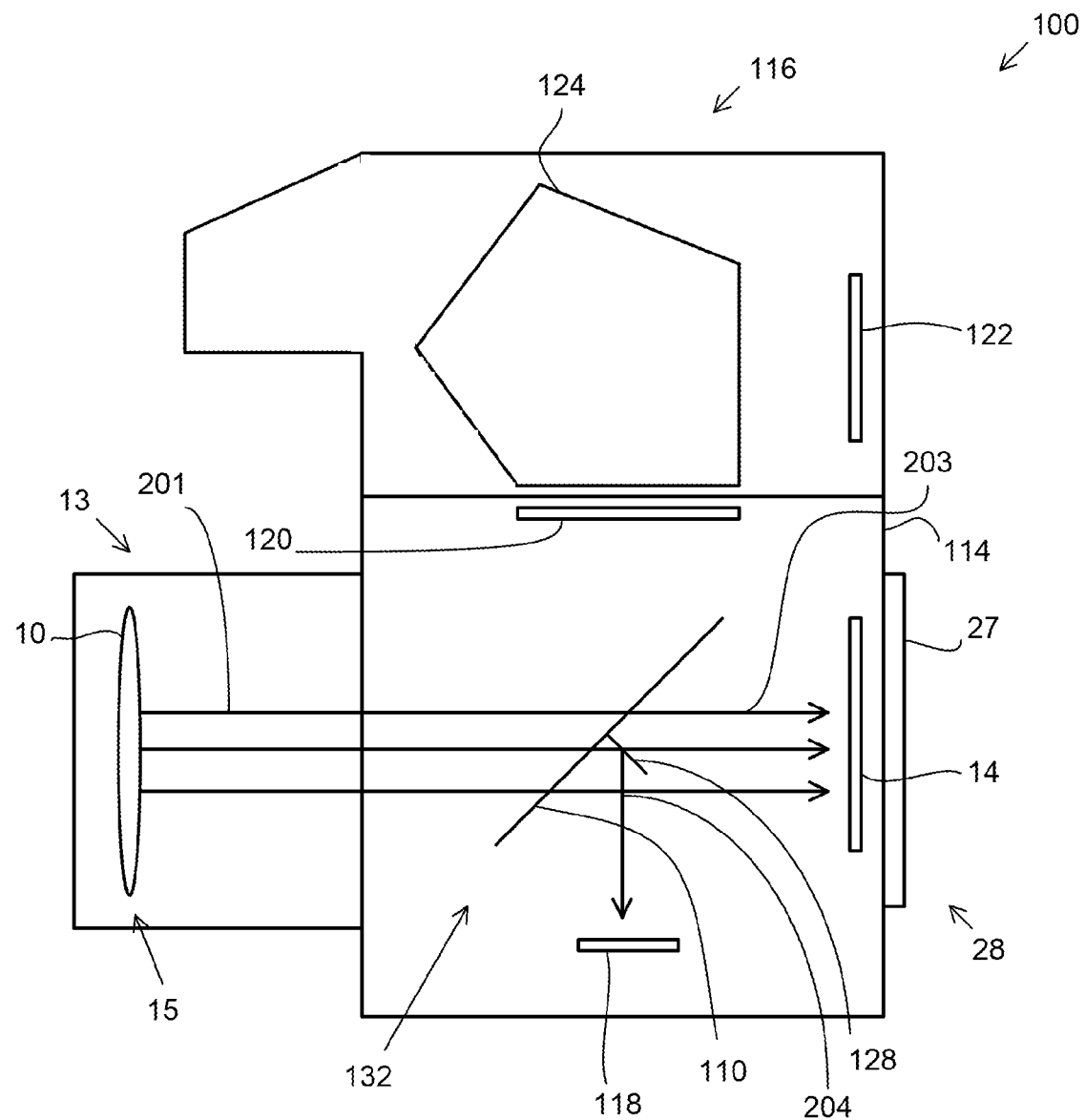
FIG. 3 is a sectional side view of the image capture apparatus of FIG. 1 in a display view mode, according to an embodiment of the invention.

FIGS. 2-3 depict embodiments of the image capture apparatus 100 in viewfinder and display view modes, respectively, with the variable translucency mirror 110 having a translucency set according to the selected mode. In the viewfinder mode shown in FIG. 2, the variably translucency mirror 110 is set to be at least partially reflective such that light incident on the variable translucency mirror 110 (light ray 201) is reflected thereby and received by the viewfinder unit 116 (light ray 202). That is, the viewfinder unit 116 can be configured to receive light reflected by the variable translucency mirror 110. According to one aspect, the variable translucency mirror 110 is set to be fully reflective in the viewfinder mode. By setting the variably translucency mirror 110 to be reflective, a user of the image capture apparatus 110 may be able to use the viewfinder unit 116 in the viewfinder mode to preview and compose an image prior to image capture.

In the display view mode shown in FIG. 3, the variable translucency mirror is set to be at least partially transparent, such that light incident on the variable translucency mirror (light ray 201) is transmitted therethrough and received by the imaging sensor 14 (light ray 203). That is, the imaging sensor 14 can be configured to receive light transmitted through the variable translucency mirror 110. The light received by the imaging sensor 14 can be converted to a signal that is sent to the image display unit 28 to provide a display of the image. According to one aspect, the variable translucency mirror 110 is set to be fully transparent in the display view mode. By setting the variably translucency mirror 110 to be transparent, a user may be able to preview and compose an image in the display view mode by viewing the displayed image generated by the image display unit 28.

Accordingly, by controlling the variable translucency mirror 110 to set a predetermined level of reflectance and transmittance of the light incident thereon in accordance with selected viewing mode, the user has the option to use either a viewfinder unit 116 or a display unit 28 in previewing and composing an image for image capture.

The variable translucency mirror 110 generally comprises a structure that is capable of providing the variable levels of translucency, and various different structures and/or compositions may be suitable according to aspects of the invention. According to one aspect, the variable translucency mirror 110 uses microblind technology to provide the variable levels of translucency. FIGS. 4a-4d illustrate embodiments of a variable translucency mirror 110 having a plurality of microblinds to provide variable levels of translucency. According to this embodiment, the mirror 110 comprises a transparent layer 300 having a plurality of microblinds 303 thereon that comprise a reflective material. The microblinds 303 are configured to be openable and/or closeable via application of a voltage thereto, thereby varying the reflective/transmissive properties of the structure. An example of microblind technology and a fabrication method thereof is described in U.S. PG-Pub No. 2006/0196613 to Lamontagne et al, which is hereby incorporated by reference herein in its entirety.

Figure 4A:
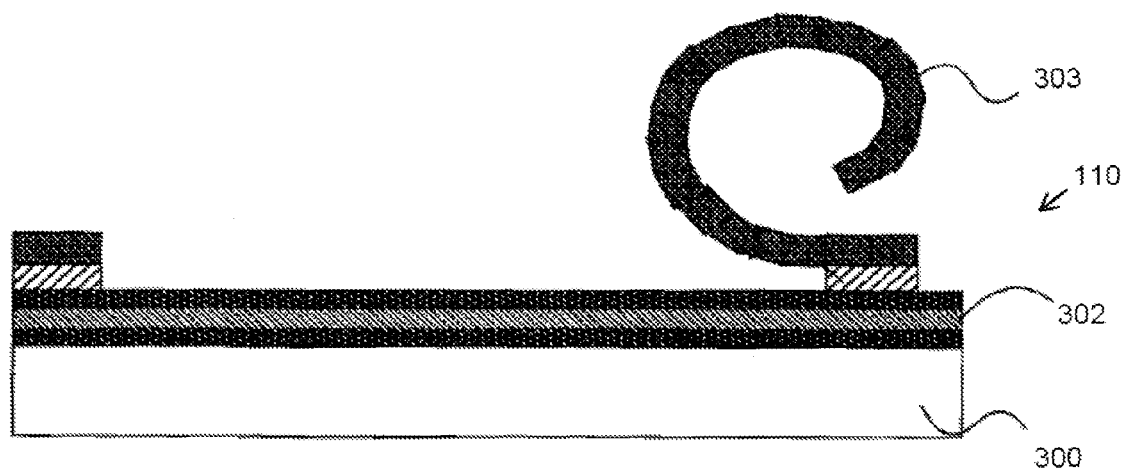
FIG. 4a is a sectional side view of the variable translucency mirror having a plurality of microblinds, according to an embodiment of the invention.
Figure 4B:
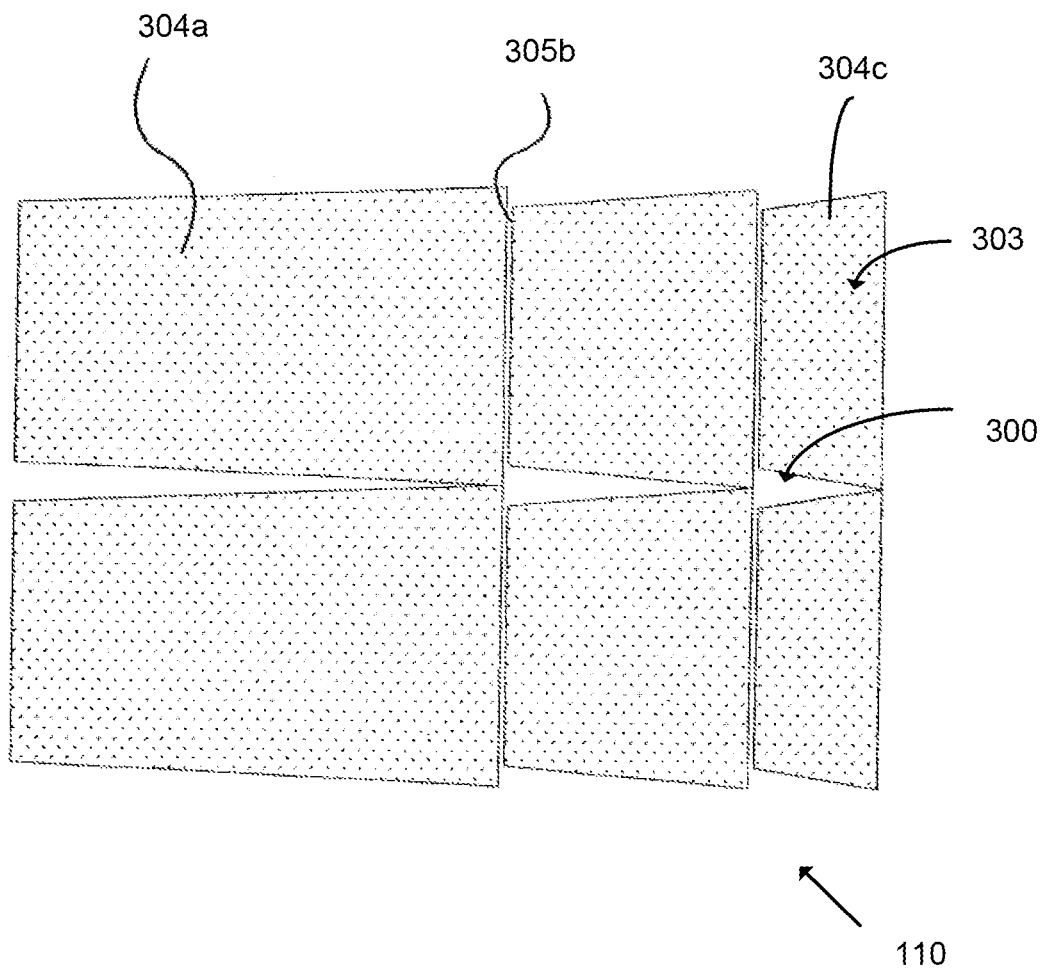
FIG. 4b is sectional top views of a variable translucency mirror having the plurality of microblinds of FIG. 4a, according to an embodiment of the invention.
Figure 4C:
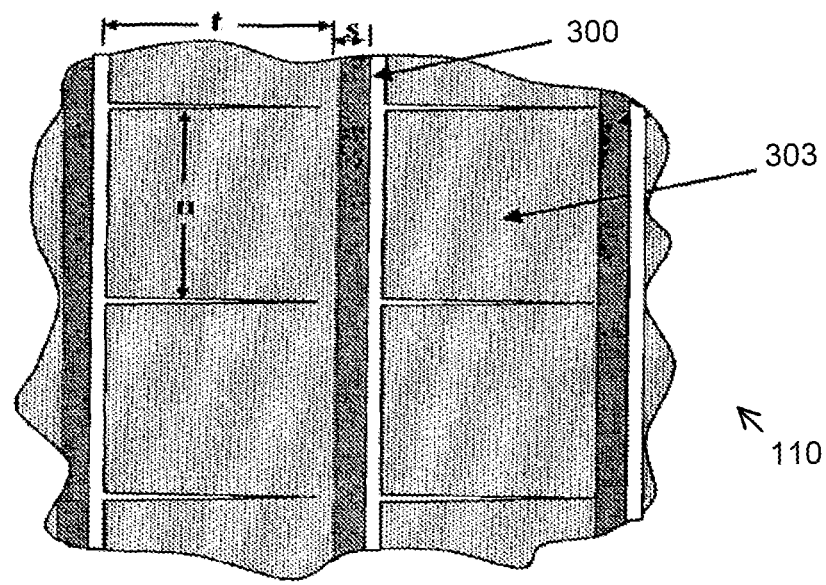
FIGS. 4c-4d are sectional top views of a variable translucency mirror having the plurality of microblinds of FIG. 4a, according to an embodiment of the invention.
Figure 4D:
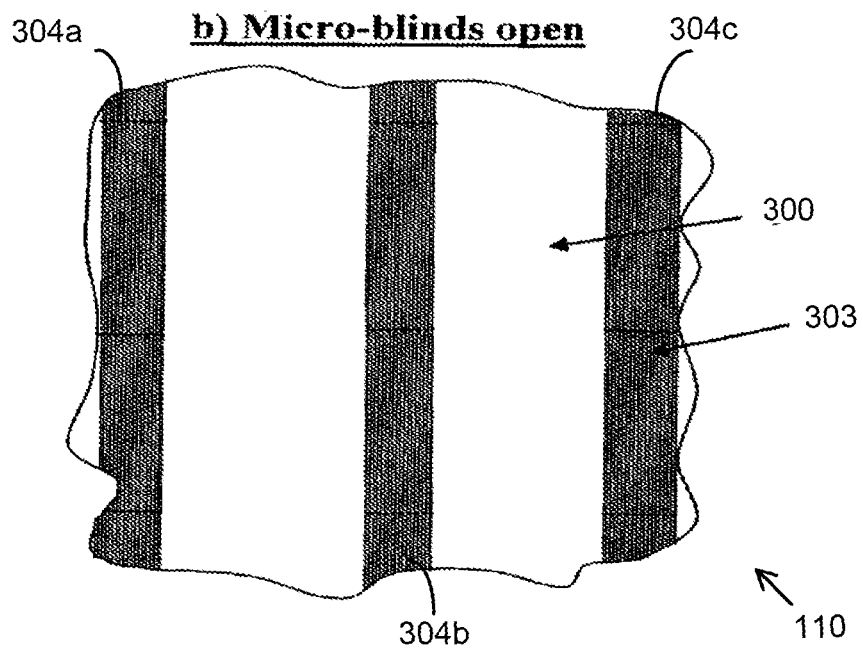

In the embodiments as shown in FIGS. 4a-4d, the microblinds 303 are configured to transition between a deployed configuration where the microblinds 303 cover the transparent layer 300, as shown in FIG. 4b, and a curled configuration where the microblinds 303 are at least partially curled up away from and expose the transparent layer 300, as shown in FIGS. 4a and 4d. The microblinds 303 can be opened and/or closed by application of a voltage thereto via one or more transparent electrically conducting layers 302 that are in electrical contact with the microblinds, as shown in FIG. 4a. That is, application of a voltage via a transparent electrically conducting layer 302 may cause an electrostatic attraction between the layer 302 and microblind 303 that overcomes any inherent stress that induces curling of the microblind 303 in the opened state, and causes the microblind to uncurl into a closed state. As shown in FIG. 4c, by closing the microblinds 303, the reflective surfaces of the microblinds 303 are deployed over the surface of the transparent layer 300, and light incident on the mirror 110 is reflected thereby. By opening the microblinds 303, as shown in FIG. 4d, the reflective surfaces are curled away to expose the transparent layer 300, and light incident on the mirror 110 is transmitted through the transparent layer 300. The microblinds 303 can also be configured such that a predetermined fraction of the microblinds 303 can be opened and/or closed at any one point in time, to provide intermediate levels of translucency between fully reflective and fully transparent. Thus, by selectively opening/closing the microblinds 303, variable levels of translucency can be provided.

According to one aspect, the microblinds 303 are configured with a plurality of different geometries, such as different shapes and sizes, such that the microblinds 303 can be selectively actuated upon application of different voltage levels via the transparent electrically conducting layer 302. For example, as shown in the embodiment depicted in FIG. 4b, the microblinds 303 can be configured such that a first column 304a (left column) of microblinds 303 is shaped and sized to be twice as long as they are wide, a second column 304b (middle column) has substantially square microblinds 303, and a third column 304c (right column) has microblinds 303 that are twice as wide as they are long. The transparent electrically conducting layer 302 may extend across the mirror area and be in contact with each of the first through third columns 304a-304c. Because the voltage required to actuate the microblinds 303 is dependent upon the microblind geometry, the voltages V1, V2 and V2 required to actuate the microblinds 303 in columns 304a, 304b, 304c, respectively, are V1>V2>V3. That is, by applying a voltage V where V2>V>V3, only those microblinds in the third column 304a will be actuated, whereas by applying a voltage V where V1<V<V2, those microblinds in the second and third columns 304a-b will be actuated, and finally by applying voltage V where V>V1, all of the microblinds 303 in the first through third columns 304a-304c will be actuated. Thus, by increasing the applied voltage V, the number of microblinds 303 that transition to the closed state can also be increased, thus making the mirror 110 more reflective. Conversely, by decreasing the applied voltage V, the microblinds 303 may be caused to transition back to the open state, thus making the mirror 110 more transmissive. Accordingly, variable levels of translucency can be provided by selectively actuating the microblinds 303 having different sizes via application of a voltage level V selected in relation to the number of microblinds to be actuated, thereby setting different levels of percent transmittance/reflectance of light through the mirror 110 having the microblinds 303.

According to yet another aspect, the microblinds 303 may be selectively openable/closeable by electrically separating the microblinds 303 from one another into different rows and/or columns. For example, as shown in FIGS. 4c-4d, the microblinds 303 can be electrically separated into different columns 304a-304b, with the microblinds 303 in each column being selectively actuated by contacting with a separate voltage source (not shown) for each column 304a-304b. In this manner, the percent transmittance/reflectance through the mirror 110 can be controlled by opening and/or closing a predetermined fraction of the microblinds via application of individual voltages to each of the columns 304a-304b. Other mechanisms for selectively opening/closing the microblinds 303 can also be provided, such as by partially or half-opening the microblinds, or by providing different configurations of the microblinds 303 and/or electrically conducting layers 302.

The use of microblind technology for the variably translucency mirror 110 can be advantageous because the microblinds 303 are generally very small in comparison to other sensor/detector components of the apparatus 100, and thus the modulation of the microblinds 303 to provide different levels of transmission/reflectance therethrough can be performed without excessively negatively impacting the function of the other sensor/detector components. For example, the microblinds 303 may be much smaller than the sensor pixels of a focus adjustment sensor 118 used for phase-detection autofocus (described below), thereby allowing for focus adjustment to be performed using light passing through mirror 110. That is, because the microblinds 303 are so much smaller than the sensor pixels, the sensor pixels may not substantially distinguish between a case where 50% of light is transmitted through every microblind site, or a case where 100% of light is transmitted through every other microblind site with 0% of light being transmitted through the other half of the microblind sites, thereby allowing for focus adjustment determination to be performed.

The application of the voltage to open and/or close the microblinds 300 can be initiated by a signal from the controller 50, such as in response to a user's switching between viewfinder and display view modes, or in response to another change in mode or settings of the image capture apparatus 100. For example, the controller 50 may provide a first signal to set a first translucency level by opening and/or closing a predetermined number of microblinds 303, and may provide a second signal to set a second translucency level that is higher or lower than the first translucency level by opening and/or closing a predetermined number of microblinds 303

The variable translucency mirror 110 can also incorporate other technologies that provide variability in the reflectance/transmittance of the mirror 110. For example, the variable translucency mirror 110 may comprise a smart glass device such as at least one of an electrochromic device, a suspended particle device, and a polymer dispersed liquid crystal device. Electrochromic devices generally comprise electrochromic materials such as reflective transition metal hydrides that change light transmission properties in response to an applied voltage, such as between reflective and transparent states. An example of an electrochromic device is described in U.S. Patent Application Publication No. 2004/0047050 to Bauer et al, which is hereby incorporated by reference in its entirety. Suspended particle devices comprise rod-like particles suspended in a fluid that align upon application of a voltage thereto, making the device transparent. Polymer dispersed liquid crystal devices similarly comprise liquid crystal particles that align upon application of a voltage thereto, also rendering the device transparent. Thus, technologies that are capable of providing different levels of transparency/reflectivity may be utilized to form the variable translucency mirror 110.

The image capture apparatus 100 may further comprise one or more focus adjustment sensors 118 that can be used to provide focus adjustment of an image, such as phase-detection autofocus adjustment, as shown in FIGS. 1-3 and 8. In a process to perform phase-detection autofocus adjustment, light rays from different parts of the lens apparatus 13 are received by the sensors 118, which are a type of light sensor, and the images from the light rays are compared to determine a phase difference therebetween. Focus correction measures can thus be implemented using this information, such as by adjusting the focal length of the lens apparatus 13 in a direction and amount calculated for correction of the phase difference. The image capture apparatus 100 can further comprise a focus adjustment determination unit 58, an embodiment of which is shown in FIG. 8, which is configured to determine the focus adjustment based on the light received by the one or more focus adjustment sensors 118. The focus adjustment determined by the focus adjustment unit 58 can be provided to a focusing controller 42 that is configured to provide focus control, such as by adjusting a focal length of the lens apparatus 13. A focus adjustment operation can be initiated, for example, by half-depressing a shutter switch 64. An embodiment of a process for performing phase-detection autofocus adjustment is described in U.S. Pat. No. 5,589,909 to Kusaka, which is hereby incorporated by reference herein in its entirety.

According to the embodiment as shown in FIGS. 1-3 and 7b, the image capture apparatus 100 further comprises one or more mirror windows 126 and one or more focus adjustment mirrors 128, which are configured to re-direct light incident on the variable translucency mirror 110 to the focus adjustment sensors 118, to provide the light for the focus adjustment. According to this embodiment, the variable translucency mirror 110 comprises one or more mirror windows 126 formed therein that are configured to pass light incident on the variable translucency mirror 110 therethrough. That is, the variable translucency mirror 110 can comprise a main mirror body 125 having a plurality apertures 130 formed therein, with a plurality of mirror windows 126 disposed in the apertures 130, as shown in the embodiment depicted in FIG. 7b. The number and arrangement of the mirror windows 126 may be selected to be suitable for transmitting the incident light for the focus adjustment. In the embodiment as shown, the plurality of mirror windows 126 comprises a central mirror window 126 formed in a center of the main mirror body 125 that is further flanked by a plurality of mirror windows extending to the sides of the central mirror window 126, and mirror windows 126 both above and below the central mirror window 126.

The one or more focus adjustment mirrors 128 are configured to receive light transmitted through the one or more mirror windows 126, and to re-direct the light towards the focus adjustment sensors 118. That is, the focus adjustment mirrors 128 can be positioned at locations behind the mirror windows 126, to receive light transmitted therethrough. According to one aspect, the focus adjustment mirrors 128 can be attached to and/or integral with the variable translucency mirror 110 as shown in the embodiment depicted in FIGS. 1-3. Alternatively, the focus adjustment mirrors 128 may be separate and spaced apart from the main body 125 of the variable translucency mirror 110.

The one or more focus adjustment mirrors 128 are provided at a position and angle with respect to the mirror windows 126 that is selected such that light received from the mirror windows 126 can be at least partially reflected by the focus adjustment mirrors 128 in a direction towards the focus adjustment sensors 118. The focus adjustment sensors 118 are configured to receive light from the one or more focus adjustment mirrors 128 and provide a signal to the focus adjustment determination unit 58 to determine a focus adjustment. In the embodiment as shown in FIGS. 1-3, a focus adjustment mirror 128 is fixed at an angle with respect to the plane of the main mirror body 125 of the variable translucency mirror 110, such as at an angle of from about 45° to about 90°, and directly behind one of the mirror windows 126, to direct light to the focus adjustment sensors 118. A plurality of such focus adjustment mirrors 128 can be provided along the back surface of the variable translucency mirror 110, with the number and arrangement of the focus adjustment mirrors 128 being provided in relation to the configuration of the plurality of mirror windows 126. The focus adjustment mirrors 128 may thus allow for focus adjustment to be performed using the light incident on the variable translucency mirror 110.

According to one aspect of the invention, the mirror windows 126 may have a fixed translucency level, such as a fixed transparency. According to another aspect of the invention, the mirror windows 126 may have a variable translucency similar to that of the main mirror body 125 of the variable translucency mirror 110, such as by virtue of being formed of a variable translucency structure or device. In the case that the mirror windows 126 have a variable translucency, the mirror windows 126 can be configured to be set at a level of translucency that is independent of a level set for the main mirror body 125 of the variable translucency mirror 110, such as by providing a signal to the mirror windows 126 that is separate from a signal provided to the main mirror body 125. Thus, the light incident on the variable translucency mirror 110 may be at least partially transmitted through the mirror windows 126 (light ray 203), while simultaneously being at least partially reflected by main mirror body 125 of the main variable translucency mirror 110 (light ray 202), in a case where the mirror windows 126 are set to be at least partially transparent, and the main mirror body 125 of the variable translucency mirror 100 is set to be at least partially reflective, as shown in the embodiment illustrated in FIG. 2.

The focus adjustment mirrors 128 can also comprise a fixed translucency level, such as a fixed reflectivity, or may comprise a variable translucency structure or device having a translucency that is separately controllable from that of one or more of the main body 125 of the variable translucency mirror 110 and the mirror windows 126. According to one aspect, the translucency level of variable translucency focus adjustment mirrors 128 can be controlled by providing a separate signal to the focus adjustment mirrors 128 from the controller 50. Thus, the light incident on the variable translucency mirror 110 may be transmitted through the mirror windows 126 (light ray 203), and may be at least partially reflected, and even fully reflected, by the focus adjustment mirrors 128 (light ray 204), in a case where the mirror windows 126 are set to be at least partially transparent, and the focus adjustment mirrors 128 are set to be at least partially reflective, as shown in the embodiment illustrated in FIG. 2.

According to one aspect of the invention, the combination of the variable translucency mirror 110 having the one or more mirror windows 126 and the one or more focus adjustment mirrors 128 can form a mirror assembly 132 that directs light to the focus adjustment sensors 118, to allow for focus adjustment with the image capture apparatus 100 in either of the viewfinder and display view modes.

Operation of the image capture apparatus 100 to perform focus adjustment in either of the viewfinder and display view modes is described with reference to the embodiments illustrated in FIGS. 2-3. FIG. 2 depicts an embodiment of the image capture apparatus 100 in the viewfinder mode. According to the embodiment as shown, the main body 125 of the variable translucency mirror 110 is set to be at least partially reflective, and even fully reflective, such that the light incident thereon is directed towards the viewfinder unit 116 to allow a user to preview and compose an image with the viewfinder unit 116. The mirror windows 126 can be set to be translucent, that is, at least partially transparent, such that at least a portion of the light incident thereon passes therethrough to the one or more focus adjustment mirrors 128, while some portion of the remainder of the light may also be reflected towards the viewfinder unit 116. The mirror windows 126 may also optionally be set to be fully transparent. The focus adjustment mirrors 18 can in turn be set to be at least partially and even fully reflective, such that the light received from the mirror windows 126 is directed to the focus adjustment sensors 118 for focus adjustment. Thus, a focus adjustment operation such as a phase-detection autofocus correction can be performed simultaneously with use of the viewfinder unit 116 in the viewfinder mode.

FIG. 3 depicts an embodiment of the image capture apparatus 100 in the display view mode. According to the embodiment as shown, the main body 125 of the variable translucency mirror 110 is set to be at least partially transparent, and even fully transparent, such that the light incident thereon passes therethrough to the imaging sensor 14. The mirror windows 126 are also set to be at least partially transparent, and even fully transparent, to provide a maximum amount of light to the imaging sensor 14 that allows for generation of a display of the image by the image display unit 28. When focus adjustment is not being performed, the focus adjustment mirrors 128 can be set to be fully transparent to pass light therethrough on to the imaging sensor 14. However, when a focus adjustment operation has been selected, the focus adjustment mirrors 128 can be set to be translucent, that is, at least partially reflective, such that at least a portion of the light incident thereon is reflected to the focus adjustment sensors 118, while a remainder of the light may be allowed to pass through the focus adjustment mirrors 128 to the imaging sensor 14. By allowing the focus adjustment mirrors 128 to be translucent, obtrusive artifacts that might otherwise arise if the mirrors were completely solid, and thus would block light from hitting the imaging sensor 14, can be reduced, and can also be further eliminated using image processing techniques. Accordingly, focus adjustment can be performed simultaneously with use of the image display unit 28 in the display view mode, to provide uninterrupted display of the image while performing focus adjustment thereof.

Table 1 below provides suitable settings according to one embodiment for the main mirror body 125 of the variable translucency mirror 110, the mirror windows 126 and the focus adjustment mirrors 128, in both the viewfinder and display view modes, when focus adjustment is performed.

TABLE 1

|  | Viewfinder Mode | Display View Mode |
|---|---|---|
| Main Mirror | Fully Reflective | Fully Transparent |
| Mirror Windows | Translucent | Fully Transparent |
| Focus Adjustment Mirrors | Fully Reflective | Translucent |

Alternatively, as described above, one or more of the mirror windows 126 and the focus adjustment mirrors 128 can be of fixed translucency, which may provide advantages in terms of reducing costs. In this embodiment, the control of the main body 125 of the variable translucency mirror 110 is the same as that shown in Table 1 above, but the mirror windows 126 and focus adjustment mirrors 128 are at a fixed translucency, and thus both partially reflect and partially transmit light incident thereon. The fixed translucency mirrors 128 and windows 126 may thus also allow for the focus adjustment simultaneously with either of the viewfinder and display view modes.

According to one aspect of the invention, once the user has pre-viewed and composed the image in either or both of the viewfinder and display view mode, and/or has performed focus adjustment, the user can select to capture the image in an image capture mode, such as by fully depressing the shutter switch 64. Furthermore, the parameters set for one or more of the mirrors/windows in the mirror assembly can be changed upon selection of the image capture mode, to facilitate the image capture.

According to one aspect, the main body 125 of the variable translucency mirror 110, the mirror windows 126 and the focus adjustment mirrors 128 may be set to be fully transparent, to allow a maximum amount of light to pass through the mirror 110 and fall on the imaging sensor 14 during image capture. This embodiment may thus allow for relatively high speed of image capture.

According to another aspect, the mirror assembly 132 including the variable translucency mirror 110 having the mirror windows 126 therein and the focus adjustment mirrors 128 may be moved out of the path of the incident light, such that the maximum light is allowed to fall on the imaging sensor 14 without passing through the variable translucency mirror 110. That is, the mirror assembly 132 or at least a portion thereof may be flipped up and/or rotated out of the way of the incoming light, by moving it from a first position 136 that is in the pathway of the incoming light, such as that occupied by the mirror assembly 132 during one or more of the viewfinder and display view modes, to a second position 138 that is out of the pathway of the light directed towards the imaging sensor 14 in the image capture mode, as shown in FIG. 1. In particular, the controller 50 may be configured to control the position of the mirror assembly 132 to set the position of the mirror assembly 132 at the first position 136 in the pathway of the light directed towards the imaging sensor 14, and to set the position of the mirror assembly 132 at the second position 138 that is out of the pathway of the light directed towards the imaging sensor 14, such the mirror assembly 132 including the variable translucency mirror 110 is moved from the first position 136 in the viewfinder and/or display view modes to the second position 138 in the image capturing mode. This embodiment may allow for relatively higher quality of the resulting images, as the received light may be allowed to fall unimpeded onto the imaging sensor 14, without any reduction in the amount of light reaching the imaging sensor 14 due to intervening mirrors and/or windows.

According to one aspect, the image capture apparatus 100 is configured to allow a user to select a mode for image capture using an image capture mode selector 67, such as by moving a switch, by selecting an option displayed by the image display unit 28, or via another type of selector. That is, a user may be able to select between the first mode for image capture in which the components of the mirror assembly 132, including the variable translucency mirror 110, are made fully transparent for image capture, and the second mode for image capture in which the mirror assembly 132 including the variable translucency mirror 110 is moved out of the path of the light for image capture. According to yet another aspect, the image capture apparatus 100 may be configured to provide image capture according to only one of the first and second image capture modes, and may not have the capability to provide image capture according to the another image capture mode, or may not provide the user the option for selection between image capture modes. The image capture apparatus 100 may also be configured such that the user has a choice of the first or second image capture mode when in one of the viewing modes, but defaults to only one of the image capture modes when in the other viewing mode. For example, the image capture apparatus 100 may be configured such that the user has a choice of either the first or second image capture mode when in the display view mode, but the mode defaults to the second image capture mode to provide higher image quality when in the viewfinder mode. The terms "higher quality" and "higher speed" when used to refer to the first and second image capture modes are relative terms, describing the general relative advantages of the first and second modes where the mirror assembly 132 is moved or the variable translucency mirror 110 is made fully transparent, respectively. However, it may also be possible to operate according to a first image capture mode that actually has a relatively higher image capture speed than a second image capture mode, and it may also be possible to operate according to a second image capture mode that has a relatively higher image capture quality than a first image capture mode.

Figure 5A:
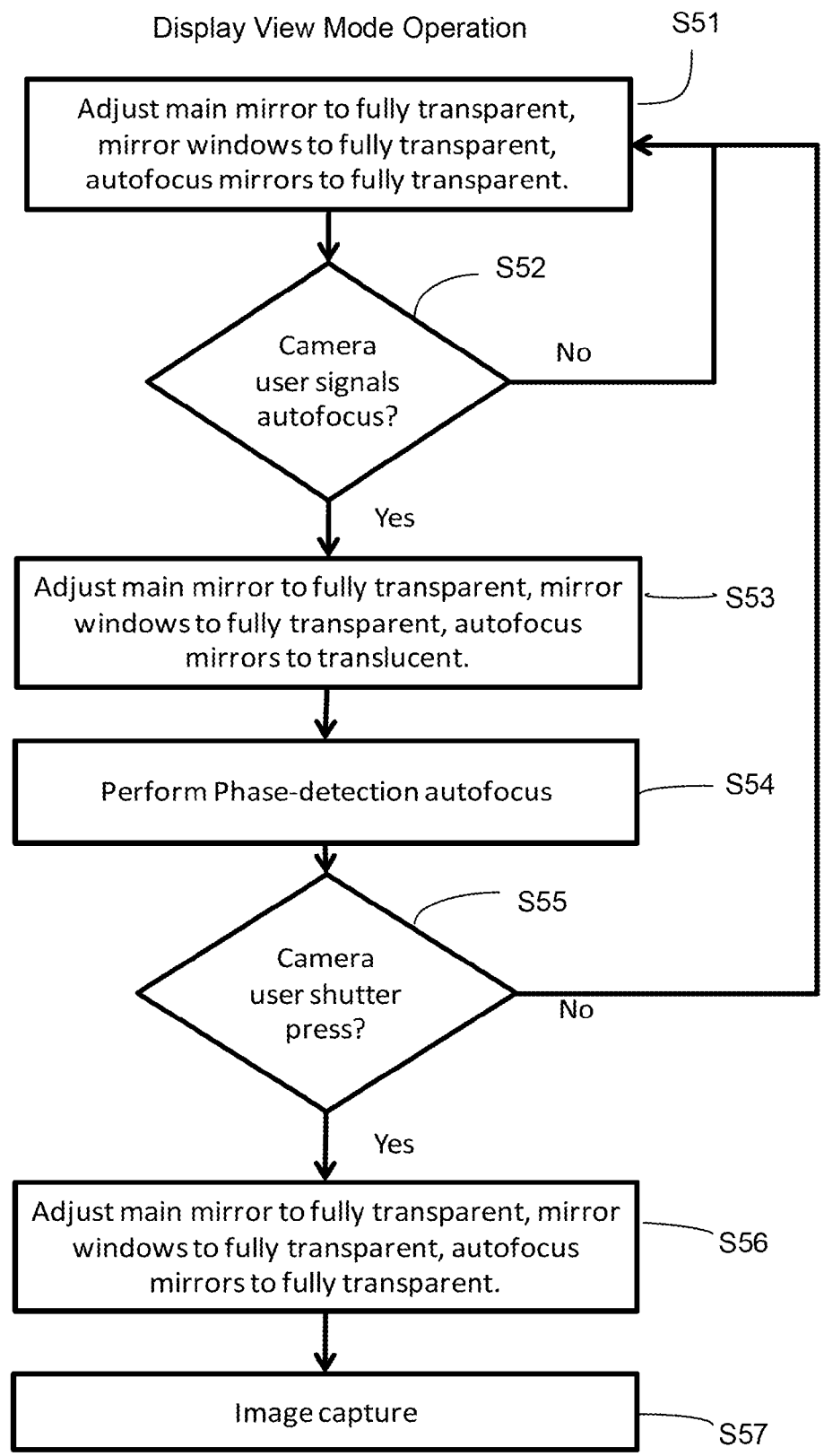
FIGS. 5a-5b are flow charts illustrating processes for focus adjustment and image capture in a display view mode, according to embodiments of the invention.

FIG. 5a is a flowchart illustrating an embodiment of operation of the image capture apparatus 100 in the display view mode. The embodiment as shown depicts a process for image capture after preview and/or focus adjustment in the display view mode, where the image capture step is performed with the image capture apparatus 100 in a relatively higher-speed image capture mode (first image capture mode). In step S51 of the process embodiment as shown, parameters for the display view mode are set by setting the main mirror body 125 of the variable translucency mirror 110 to be fully transparent, setting the mirror windows 126 to be fully transparent 126, and setting the focus adjustment mirrors 128 to be fully transparent. Step S51 may be performed to set the parameters for the display view mode, for example, upon turning on and/or powering up the apparatus 100, or after switching to the display view mode from the viewfinder mode or other mode. In step S52, it is determined whether the user has selected to perform focus adjustment, such as phase-detection autofocus adjustment. The user may select the focus adjustment by, for example, half-depressing the shutter switch 64, or by another indication. If it is determined in step S52 that focus adjustment has not been selected (No in step S52), then the image capture apparatus stays in the display view mode state depicted in step S51. If it is determined in step S52 that the user has selected to perform focus adjustment (Yes in step S52), then the process proceeds to step S53, where parameters for performing a focus adjustment operation in the display view mode are set. In step S53, the main body 125 of the variable translucency mirror 110 and the mirror windows 126 are maintained fully transparent, and the focus adjustment mirrors 128 are switched from fully transparent to translucent, such that at least a portion of the light incident on the focus adjustment mirrors 128 is deflected towards the focus adjustment sensors 118 to perform the focus adjustment operation.

In step S54, focus adjustment is performed, such as by phase-detection autofocus adjustment, with the focus adjustment determination unit 58 determining the focus adjustment based on the light received by the focus adjustment sensors 118. In step S55, it is determined whether the user has selected to perform image capture, such as by fully depressing the shutter switch 64. If it is determined in step S55 that the user has not selected image capture (No in step S55), then the process returns to step S51 and the focus adjustment mirrors 128 are set back to being fully transparent. However, if it is determined in step S55 that the user has selected image capture (Yes in step S55), then the process proceeds to step S56 where all of the main mirror body 125 of the variable translucency mirror 110, the mirror windows 126, and the focus adjustment mirrors 128 are set to be fully transparent. The parameters set in step S56 allow light to pass through the variable translucency mirror 110 to provide for a relatively higher-speed image capture mode. The process then proceeds to step S57 where the image is actually captured.

Figure 5B:
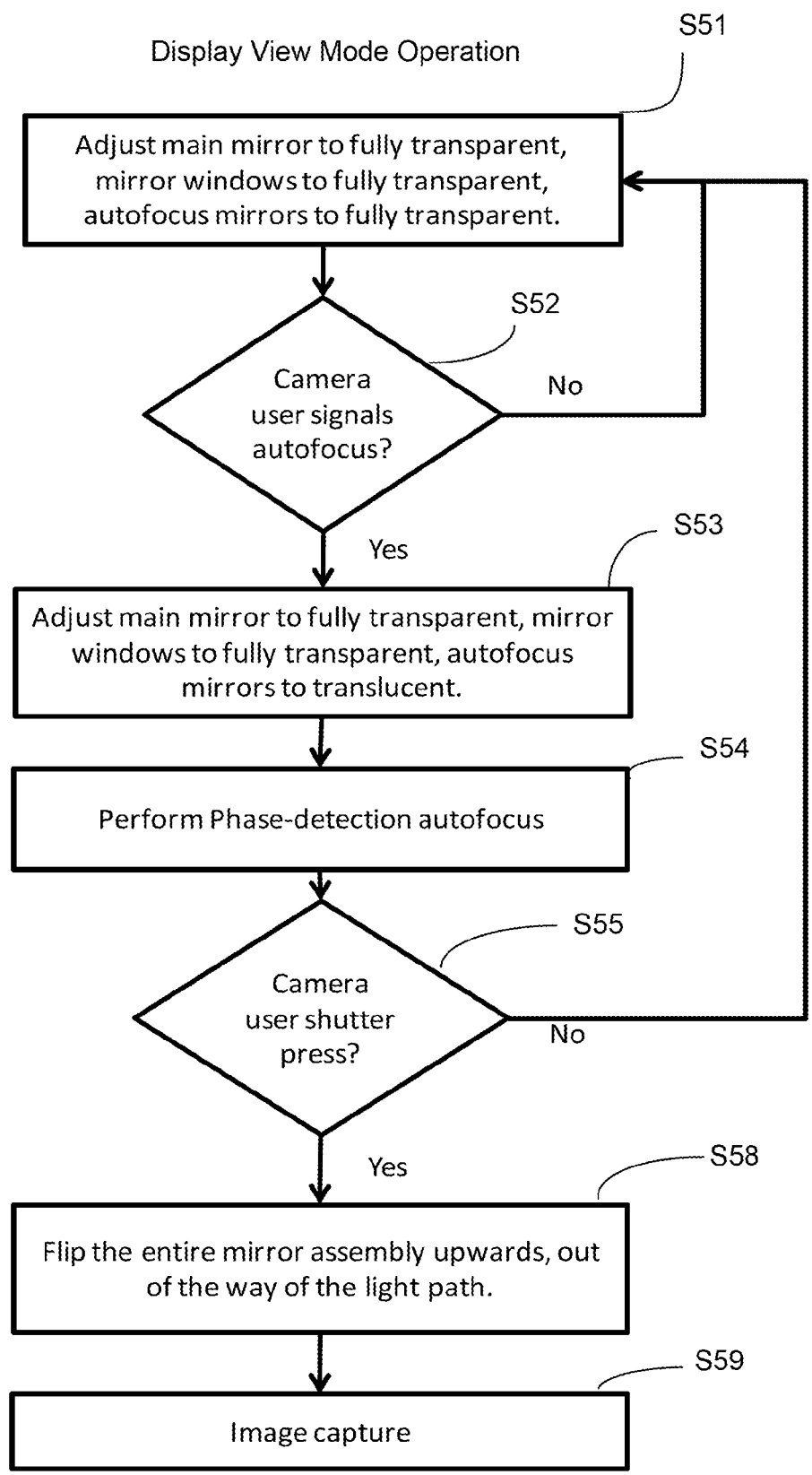

FIG. 5b is a flowchart illustrating another embodiment of operation of the image capture apparatus 100 in a display view mode. The embodiment as shown depicts a process for image capture after preview and/or focus adjustment in the display view mode, where the image capture step is performed with the image capture apparatus 100 in a relatively higher-quality image capture mode (second image capture mode). In this embodiment, steps S51-S55 are the same as those described for the embodiment shown in FIG. 5b, and thus the description of these steps is not repeated. Following a determination in step S55 that a user has selected image capture (Yes in step S55), the process proceeds to step S58, where the entire mirror assembly 132 including the variable translucency mirror 110 having the mirror windows 126 therein, and the focus adjustment mirrors, are flipped upwards and out of the way of the light path. By moving the mirror assembly 132 out of the light path, the light is allowed to fall unobstructed onto the imaging sensor 14, thus providing for a higher-quality image capture mode. The process then proceeds to step S59, where the image is actually captured.

Figure 5C:
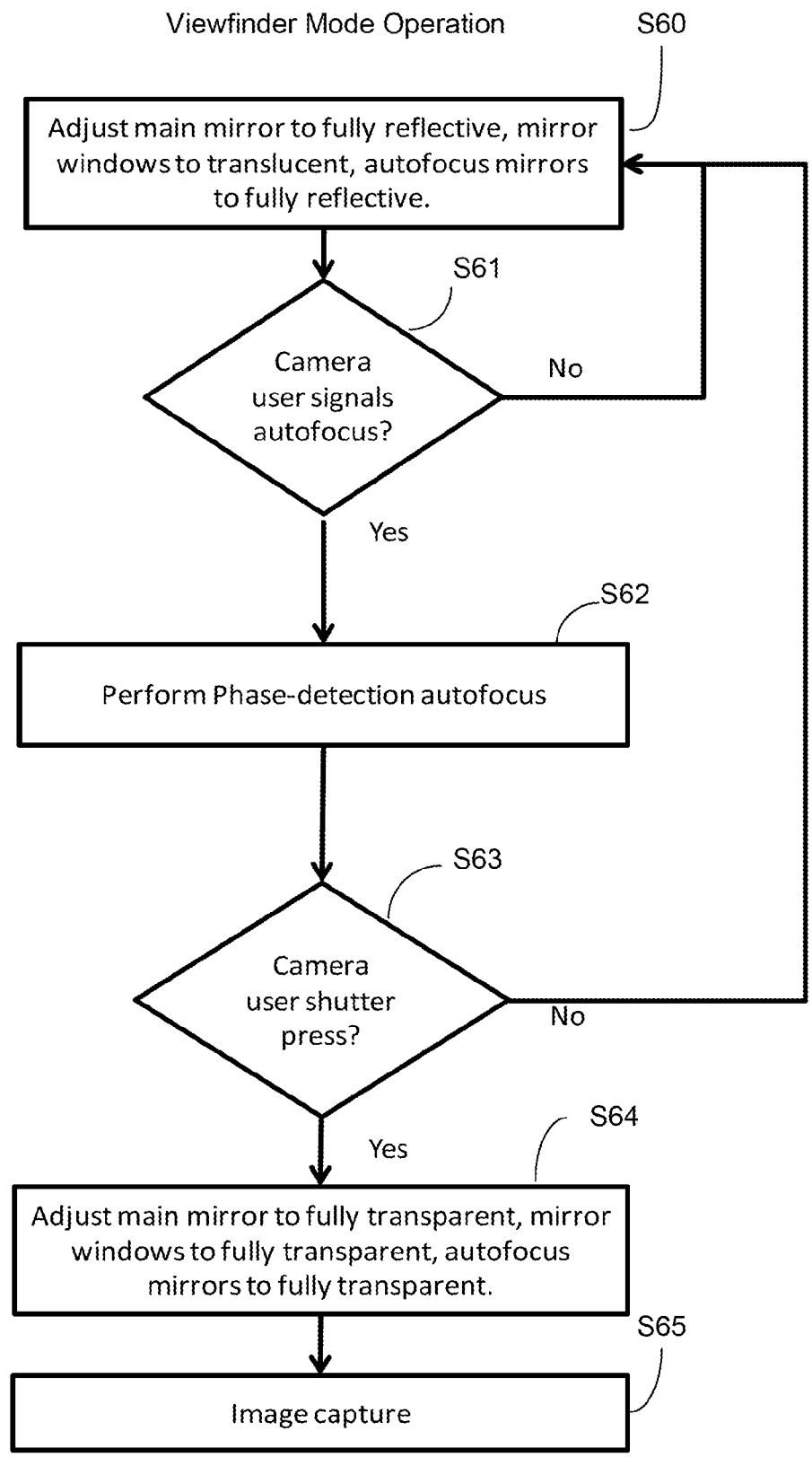
FIGS. 5c-5d are flow charts illustrating processes for focus adjustment and image capture in a viewfinder mode, according to embodiments of the invention.

FIG. 5c is a flowchart illustrating an embodiment of operation of the image capture apparatus 100 in a viewfinder mode. The embodiment as shown depicts a process for image capture after preview and/or focus adjustment in the viewfinder mode, where the image capture step is performed with the image capture apparatus 100 in a relatively higher-speed image capture mode (first image capture mode). In step S60 of the process embodiment as shown, parameters for the viewfinder mode are set by setting the main mirror body 125 of the variable translucency mirror 110 to be fully reflective, setting the mirror windows 126 to be translucent, and setting the focus adjustment mirrors 128 to be fully reflective. Step S60 may be performed to set the parameters for the viewfinder mode, for example, upon turning on and/or powering up the apparatus 100, or after switching to the viewfinder mode from the display view mode or other mode. In step S61, it is determined whether the user has selected to perform focus adjustment. If it is determined in step S61 that focus adjustment has not been selected (No in step S61), then the image capture apparatus 100 stays in the state depicted in step S60.

If it is determined in step S61 that the user has selected to perform focus adjustment (Yes in step S61), then the process proceeds to step S62, where focus adjustment is performed, such as phase-detection autofocus adjustment with the focus adjustment determination unit 58 determining the focus adjustment based on the light received by the focus adjustment sensors 118. During the focus adjustment operation performed in step S62, the main body 125 of the variable translucency mirror 110 and the focus adjustment mirrors 128 may be maintained fully reflective, and the mirror windows 126 may be maintained translucent. These parameters may be suitable for the focus adjustment step in step S62, because the translucency of the mirror windows 128 may be sufficient to allow an adequate amount of light to pass therethrough and be deflected by the fully reflective focus adjustment mirrors 128 towards the focus adjustment sensors 118 for determination of the focus adjustment. Alternatively, the mirror windows 128 may optionally be set to be fully transparent, or at least more transparent, prior to the focus adjustment in step S62, such as upon determining that the focus adjustment operation has been selected in step S61, to provide an increased amount of light to the focus adjustment sensors 118. As yet another alternative, the mirror windows 128 may be set to be fully reflective in step S60 of the display view mode, and may then be switched to translucent or even fully transparent after step S61 to allow for the focus adjustment operation in step S62.

In step S63, it is determined whether the user has selected image capture, such as by fully depressing the shutter switch 64. If it is determined in step S63 that the user has not selected image capture (No in step S63), the process returns to step S60, and the settings of the main mirror body 125 of the variable translucency mirror 110, the focus adjustment mirrors 128, and the mirror windows 128 are either maintained as-is or are set back to those values previously set in step S60, depending on whether or not they have been changed in the interim. However, if it is determined in step S63 that the user has selected image capture (Yes in step S63), then the process proceeds to step S64 where all of the main body 125 of the variable translucency mirror 110, the mirror windows 126, and the focus adjustment mirrors 128 are set to be fully transparent. The parameters set in step S64 allow light to pass through the variable translucency mirror 110 to provide for a relatively higher-speed image capture mode. The process then proceeds to step S65 where the image is actually captured. By setting the variable translucency mirror 110 to be fully transparent during image capture, not only can the image be captured with higher speed as compared to the case when the mirror assembly 132 is "flipped up" or moved out of the way, but also the image capture apparatus 100 may be able to re-set parameters for the viewfinder mode more quickly after image capture, and the image capture may also proceed more quietly.

Figure 5D:
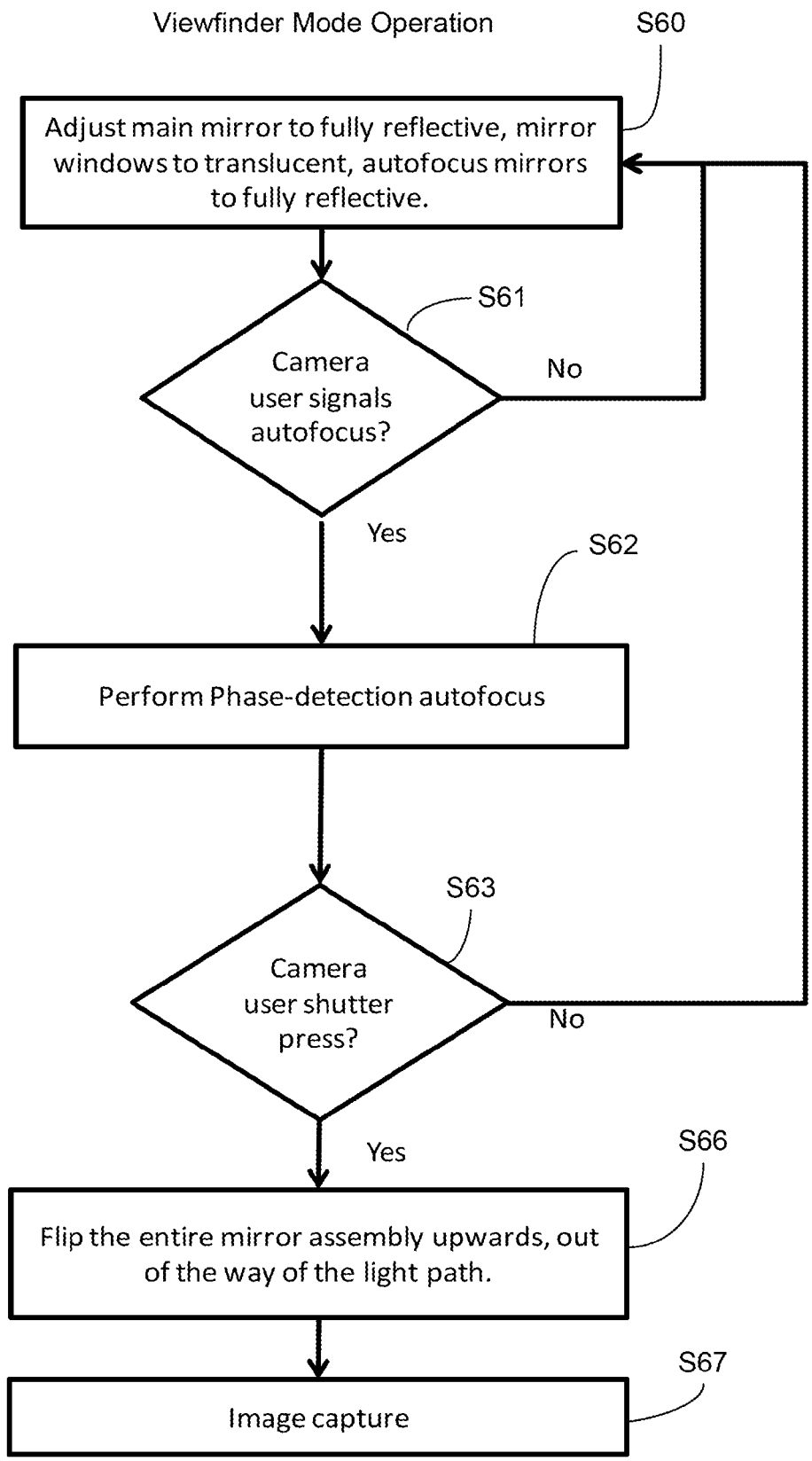

FIG. 5d is a flowchart illustrating another embodiment of operation of the image capture apparatus 100 in the viewfinder mode. The embodiment as shown depicts a process for image capture after preview and/or focus adjustment in the viewfinder mode, where the image capture step is performed with the image capture apparatus 100 in a relatively higher-quality image capture mode (second image capture mode). In this embodiment, steps S60-S63 are the same as those described for the embodiment shown in FIG. 5c, and thus a description of these steps is not repeated. Following a determination in step S63 that a user has selected image capture (Yes in step S63), the process proceeds to step S66, where the entire mirror assembly 132 including the variable translucency mirror 110 having the mirror windows 126 therein, and the focus adjustment mirrors 128, are flipped upwards and out of the way of the light path. By moving the mirror assembly 132 out of the light path, the light is allowed to fall unobstructed onto the imaging sensor 14, thus providing for a higher-quality image capture mode. The process then proceeds to step S67, where the image is actually captured.

Figure 6A:
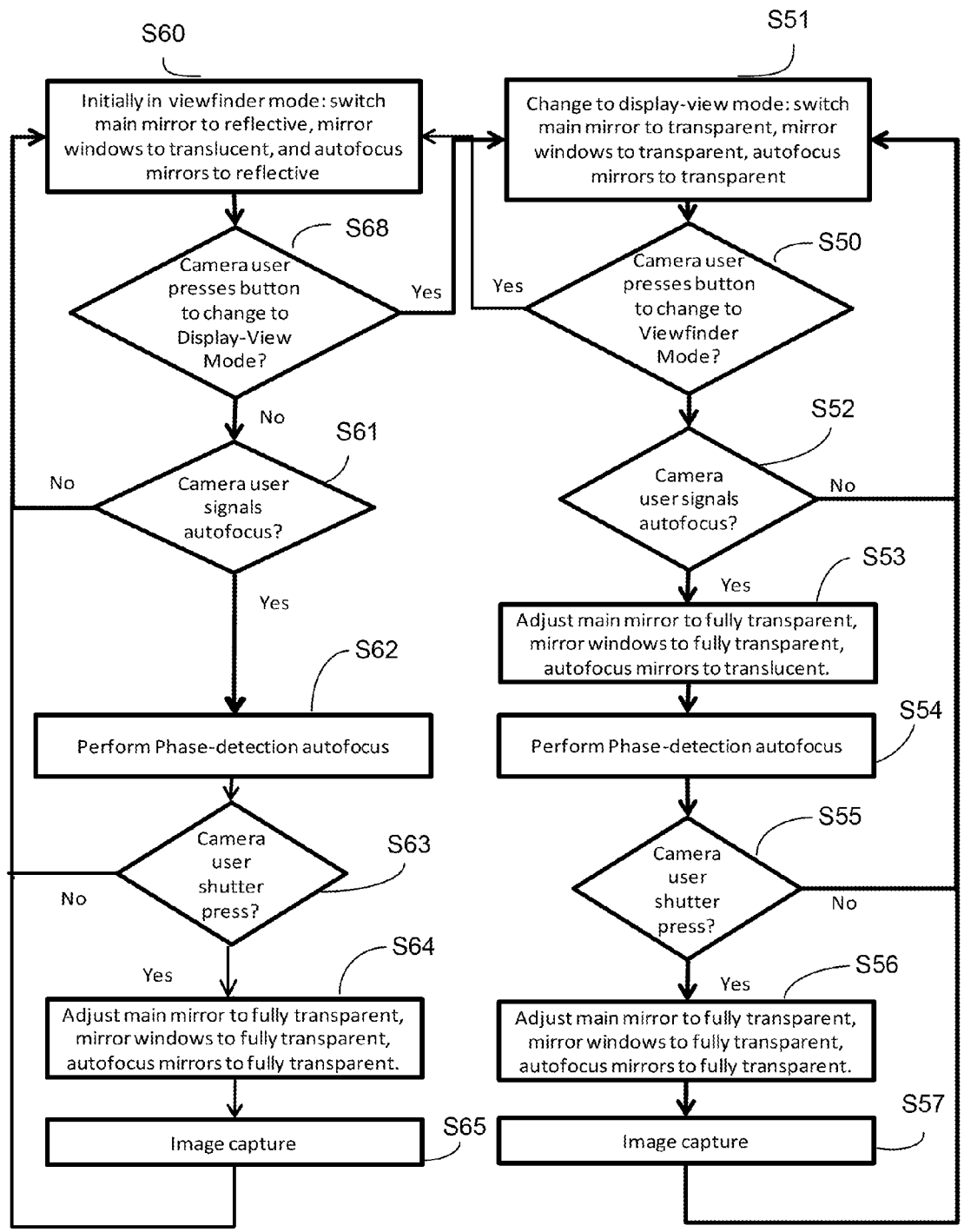
FIGS. 6a-6b are flow charts illustrating processes for switching between viewfinder and display view modes, and for performing focus adjustment and image capture, according to embodiments of the invention.
Figure 6B:
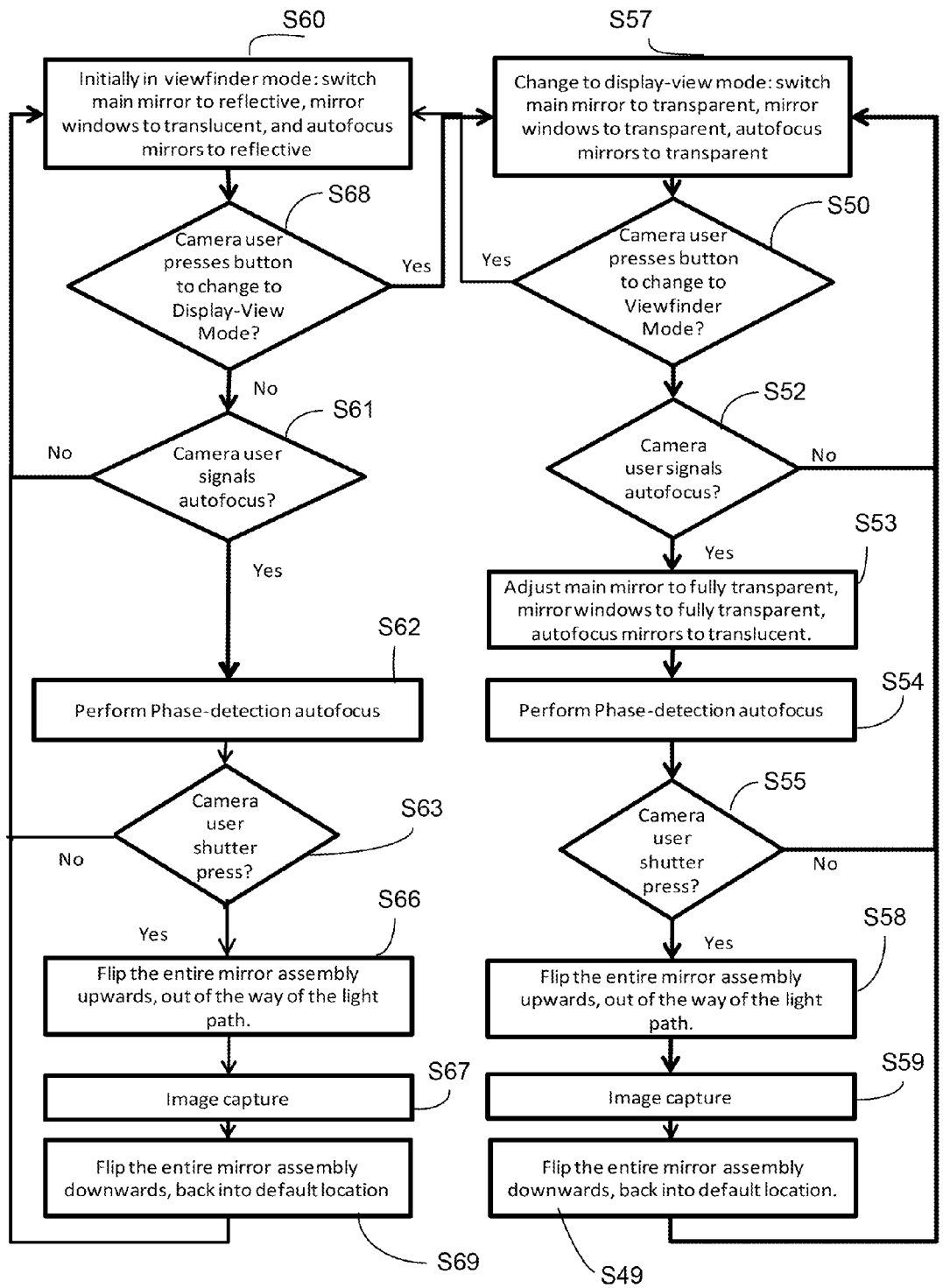

FIGS. 6a-6b are flowcharts illustrating embodiments of operation of the image capture apparatus 100 that allows for selection of either the viewfinder or display view mode. FIG. 6a illustrates an embodiment that provides relatively higher speed of image capture (first image capture mode) in either the viewfinder mode, represented by steps S60-S65 and step S68, or the display view mode, represented by steps S51-S57 and step S50. Steps S60-S65 in the viewfinder mode are the same as those described in the process embodiment illustrated in the flow chart FIG. 5c, and steps S51-S57 in the display view mode are the same as those described in the process embodiment illustrated in FIG. 5a, and thus are not further described.

According to the embodiment as shown in FIG. 6a, when the image capture apparatus 100 is placed in the viewfinder mode, such as when the image capture apparatus 100 is started up in the viewfinder mode or is otherwise switched to the viewfinder mode, the main mirror body 125 of the variable translucency mirror 110 is set to be fully reflective, the mirror windows 126 are set to be translucent, and the focus adjustment mirrors 128 are set to be fully reflective, as shown in step S60, and as previously described in the process embodiment illustrated in FIG. 5c. The process then proceeds to step S68, where it is determined whether a user has selected to switch from the viewfinder mode to the display view mode. If the user has not selected to switch the mode (No in step S68), the process proceeds to steps S61-S65, as previously described in the process embodiment illustrated in FIG. 5c.

However, if the user has selected to switch the mode (Yes in step S68), the process proceeds to step S51, where parameters are set for operating the image capture apparatus 100 in the display view mode. The parameters set in step S51 for operating in the display view mode include setting the main body 125 of the variable translucency mirror 110, the mirror windows 126 and the focus adjustment mirrors 128 to be fully transparent, as previously described in the process embodiment illustrated in FIG. 5a. The process then proceeds to step S50, wherein it is determined whether the user has selected to switch from the display view mode back to the viewfinder mode. If the user has not selected to switch (No in step S50), the process proceeds to step S52, as previously described in the process embodiment illustrated in FIG. 5a. However, if the user has selected to switch the mode (Yes in step S50), the process returns to step S60 where parameters suitable for the viewfinder mode are re-set. Similarly, in a case where the state of the image capture apparatus 100 starts in the display view mode with parameters set according to step S51, the parameters can be re-set according to a determination that the user has selected a different mode, as in steps S50 and S68. Furthermore, after image capture has been performed in either of step S65 (viewfinder mode) or step S57 (display view mode), the settings for the main mirror body 125 of the variable translucency mirror 110, the mirror windows 126 and the focus adjustment mirrors 128 can be set according to the parameters specified in steps S60 (viewfinder mode) and S51 (display view mode), respectively.

FIG. 6b illustrates an embodiment that provides relatively higher quality of image capture (second image capture mode) in either the viewfinder mode, represented by steps S60-S63 and step S68, or the display view mode, represented by Steps S51-S55 and step S50. Steps S60-S63 and S68 in the viewfinder mode are the same as those described in the process embodiment illustrated in the flow chart FIG. 6a, and steps S51-S555 and S50 in the display view mode are the same as those described in the process embodiment illustrated in FIG. 6a, and thus these steps are not further described herein. In the embodiment of the process flow illustrated in FIG. 6a, it is determined in either step S63 (viewfinder mode) or step S55 (display view mode) whether a user has pressed the shutter switch 64 to initiate image capture. If so (Yes in either step S63 or step S55), the process proceeds to either step S64 (viewfinder mode) or step S56 (display view mode). In steps S54 (viewfinder mode) and step S56 (display view mode) the main body 125 of the variable translucency mirror 110, the mirror windows 126 and the focus adjustment mirrors 128 are set to be fully transparent, to allow for image capture in the subsequent image capture steps S65 (viewfinder mode) or S57 (display view mode). In contrast, in the embodiment of the process flow illustrated in FIG. 5b, when in it is determined in either step S63 (viewfinder mode) or step S55 (display view mode) that a user has pressed the shutter switch 64 to initiate image capture, the process proceeds to either step S66 (viewfinder mode) or step S59 (display view mode). In step S66 (viewfinder mode) and step S59 (display view mode), the entire mirror assembly 132 is "flipped up" and moved out of the way of the light path, to allow for image capture in step S67 (viewfinder mode) and step S59 (display view mode). Furthermore, following the image capture steps S67 (viewfinder mode) and S59 (display view mode), the entire mirror assembly is "flipped back" to the initial position in step S69 (viewfinder mode) and step S49 (display view mode), and the process returns to steps S60 and S51 for the viewfinder mode and the display view mode, respectively.

Accordingly, the processes shown in the flowcharts of FIGS. 5a-5d and 6a-6b illustrate embodiments of operation of the image capture apparatus 100 in viewfinder and display view modes, as well as operations for focus adjustment and image capture in these modes, where the image capture can be performed according to either a higher quality or higher speed image capture mode.

Figure 7A:
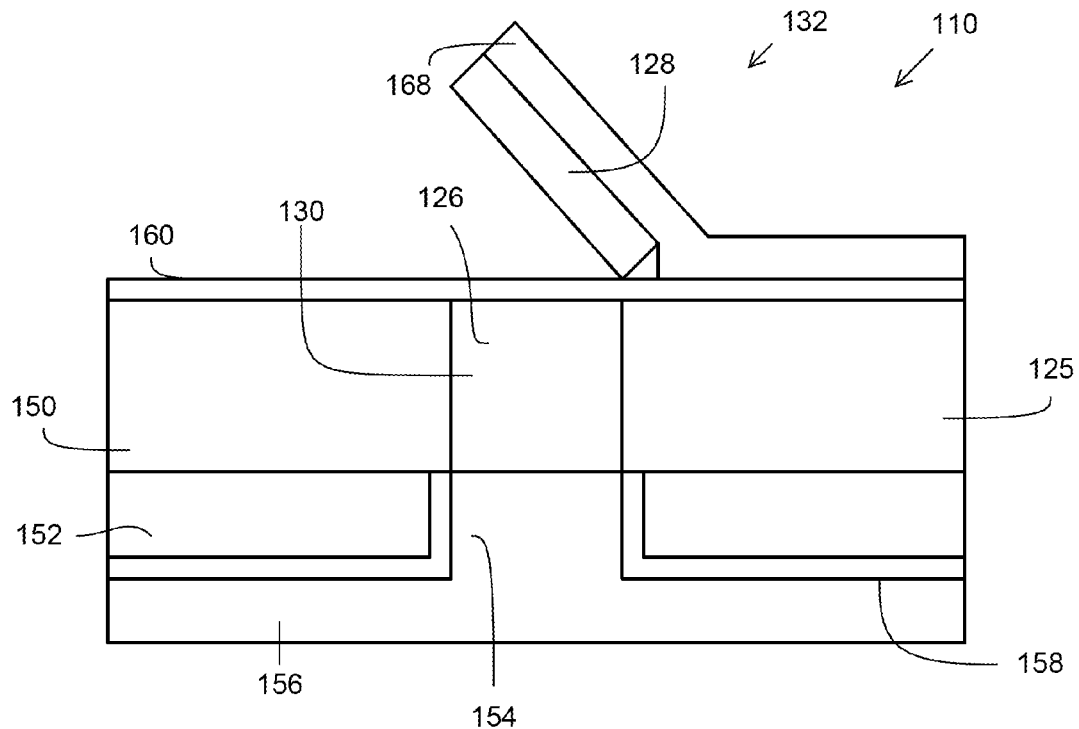
FIG. 7a is a sectional side view of a mirror assembly having a variable translucency mirror, according to an embodiment of the invention.
Figure 7B:
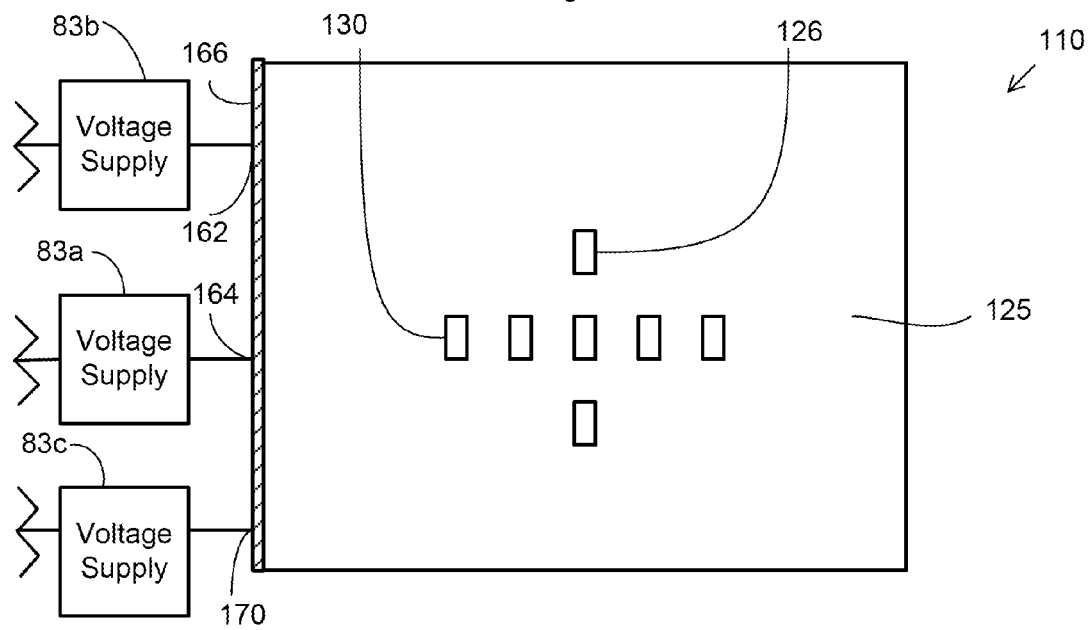
FIG. 7b is a schematic view of a variable translucency mirror having mirror windows, according to an embodiment of the invention.

FIGS. 7a-7b illustrate an embodiment of a mirror assembly 132 comprising a variable translucency mirror 110 according to aspects of the invention. According to this embodiment, the variable translucency mirror 110 comprises the main mirror body 125 and a plurality of mirror windows 126 disposed in the main mirror body 125, with at least one of the main mirror body 125 and the plurality of mirror windows 126 comprising a variable translucency member 150. The variable translucency member is a structure having a translucency that can be variably set to provide a predetermined transmittance and reflectance of light incident thereon, as has been described for the variable translucency mirror 110 above, such as a microblind structure. In the embodiment as shown in FIGS. 7a-7b, both the main mirror body 125 and the plurality of mirror windows 126 are formed from variable translucency members 150, with main mirror body 125 and the plurality of mirror windows 126 being configured such that a translucency of the main mirror body 125 can be set independently of the translucency of the plurality of mirror windows 126.

FIG. 7a illustrates an embodiment of a variable translucency mirror 110 with variable translucency mirror windows 126, where the translucency of the main mirror body 125 can be set independently from the translucency of the plurality of mirror windows 126. According to this embodiment, the main mirror body 125 comprises a variable translucency mirror having one or more apertures 130 therein, and the plurality of mirror windows 126 comprises a plurality of variable translucency mirror windows disposed in the apertures 130 of the main variable translucency mirror 125. The variable translucency mirror 110 further comprises a first conductive layer 152 below the main mirror body 125 that is in electrical contact with the main mirror body 125. The first conductive layer 152 is also transparent, and has one or more apertures 154 therein that are aligned with the apertures 130 in the main mirror body 125. A second conductive layer 156 is provided below the first conductive layer 152, and extends through the apertures 154 of the first conductive layer 152 to electrically contact the mirror windows 126. The second conductive layer 156 is also transparent, and a transparent insulating layer 158 is further provided between the first and second conductive layers 152, 156.

The configuration of the variable translucency mirror 110 in the embodiment as shown thus allows for the translucency of the main variable translucency mirror 125 to be controlled independently of the translucency of the mirror windows 126, by providing an electrical signal thereto via one or more of the first and second conductive layers 152, 156. For example, the system controller 50 can be configured to independently control the main mirror body 125 and the mirror windows 125 by application of voltage thereto via the first and second conductive layers 152, 156. The voltages can be supplied by one or more voltage supplies, such as separate voltage supplies 83a and 83b that are controlled by signals from the system controller 50, and that are electrically connected to contact points 164, 162 located at an edge 166 of the first and second conductive layers 152, 156. Thus, when the main mirror body 125 is set to be reflective, light incident thereon is reflected. When the main mirror body 125 is set to be transparent, the light incident thereon passes through the main mirror body 125 as well as the transparent first and second conductive layers 152, 156 and the transparent insulating layer 158. Similarly, when the variable translucency mirror windows 126 are set to be reflective, light incident thereon is reflected. When the variable translucency mirror windows 126 are set to be transparent, the light incident thereon passes through the variable translucency mirrors 126 as well as the transparent second conductive layer 156 below the variable translucency mirrors 126. Furthermore, since the conductive layers extend along the length of the variable translucency mirror 110, they can be individually accessed at the edge 166 of the mirror 110.

The variable translucency mirror 110 according to the embodiment as shown in FIGS. 7a-7b further comprises one or more secondary variable translucency mirrors corresponding to the focus adjustment mirrors 128, which extend at an angle from a plane of the main mirror body 125, and which are aligned with the mirror windows 126. A transparent second insulating layer 160 can be provided on the main mirror body 125, and a third conductive layer 168 can be configured to extend over at least a portion of the second insulating layer 160 and over the focus adjustment mirrors 128 to provide electrical contact therewith, the third conductive layer 168 being transparent. In the case that microblinds are used to provide the variable translucency of the main mirror body 125, a small gap may be provided between the transparent second insulating layer 160 and the surface of the main mirror body 125 to allow sufficient space for the microblinds when opened. The translucency of the focus adjustment mirrors 128 can thus also be controlled independently of one or more of the main mirror body 125 and the mirror windows 126, by providing an electrical signal thereto from the system controller 50, such as for example by application of an electrical signal to voltage supply 83c that is electrically connected to contact point 170 located at the edge 166 of the variable translucency mirror 110, to provide a voltage via the third conductive layer 168.

The embodiment of the variable translucency mirror 110 shown in FIGS. 7a-7b thus provides a mirror assembly 132 comprising a configuration of the variable translucency main mirror body 125, variable translucency mirror windows 126 and variable translucency focus adjustment mirrors 128 that can be independently controlled from one another to provide varying different levels of reflectance/transmittance from one another. However, aspects of the invention are not limited to this particular embodiment, and other combinations/configurations of the main mirror body 125, mirror windows 126 and/or focus adjustment mirrors 128 can also be provided.

Accordingly, aspects of the invention provide an image capture apparatus 100 that is capable of providing for autofocus adjustment, such as phase-detection autofocus adjustment, when the image capture apparatus 100 is operated in either of the viewfinder and display view modes. A user may thus have the option of using either a viewfinder unit 116 or an image display unit 28 to preview and compose an image, while also performing autofocus adjustment during the image preview. The image capture apparatus 100 may also be configured to provide an image capture mode where the variable translucency mirror 110 is made fully transparent, thereby providing a relatively higher-speed of image capture. The image capture apparatus 100 may also and/or alternatively be configured to provide an image capture mode where the variable translucency mirror 110 is moved out of the path of incident light, thereby providing a relatively higher-quality of image capture. Aspects of the image capture apparatus 100 may thus provide advantages in terms of increasing options for operating in different preview modes while providing autofocus adjustment, as well as for image capture, thus increasing the ease-of-use and flexibility of the image capture apparatus 100.

FIG. 8 illustrates an embodiment of an image capture apparatus 100 according to aspects of the invention. Aspects of the invention are not limited to the embodiment of the image capture apparatus 100 as shown, and other embodiments and/or systems may also be provided. The embodiment of the image capture apparatus 100 includes a lens 10 (which may be a part of an image forming optical system 15 including a plurality of lenses), an aperture 11 (which may include a plurality of apertures, for example a multi-aperture array), a shutter 12, and the imaging sensor 14 (which may include a plurality of light sensors) that converts incident electromagnetic radiation into electrical signals. Furthermore, in other embodiments the lens 10, the aperture 11, and the shutter 12 may be arranged differently than shown in the embodiment of FIG. 8. The embodiment of the image capture apparatus 100 as shown further comprises a mirror assembly 132 having the variable translucency mirror 110.

Electromagnetic radiation (also referred to herein as "light") reflected from a scene (e.g., an object in the scene) passes through the lens 10, the aperture 11, and the shutter 12 (when open) to the imaging sensor 14 and may form an optical image on a light sensing surface of the imaging sensor 14. The imaging sensor 14 converts the light to analog image signals and outputs the signals to an A/D converter 16. The A/D converter 16 converts the analog image signals to digital image signals. The imaging sensor 14 can detect light in the spectrum visible to the human eye and/or in the spectrum that the human eye cannot detect (e.g., infrared, x-ray, ultraviolet, gamma rays).

The image capture apparatus 100 also includes an image processing unit 20, which applies resize processing, such as predetermined interpolation and reduction, and color conversion processing to data from the A/D converter 16 or data from a memory 30. The image processing unit 20 performs predetermined arithmetic operations using the captured image data, and the image capture apparatus 100 may perform exposure control and ranging control based on the obtained arithmetic result. The image capture apparatus 100 may perform AF (auto focus) processing, AE (auto exposure) processing, and EF (flash pre-emission) processing. The image processing unit 20 may further perform AWB (auto white balance) operations.

Output data from the A/D converter 16 is written in the memory 30 via the image processing unit 20 and/or memory control unit 22. The memory 30 stores image data that is captured by the imaging sensor 14 and converted into digital data by the A/D converter 16. The memory 30 may store images (e.g., still photos, videos) and other data, for example metadata and file headers for captured images. The memory 30 may also serve as an image display memory. D/A converter 26 converts digital data into an analog signal and supplies that analog signal to an image display unit 28. The image display unit 28 presents images according to the analog signal from the D/A converter 26 on a display 27 (e.g., an LCD, an LED display, an OLED display, a plasma display, a CRT display). The image capture apparatus 100 also includes the optical viewfinder 116, as has been described above.

A focusing controller 42 can be configured to control at least one of the position of the lens apparatus 100 and the size of the aperture 11, such as in response to a signal received from the controller 50 that is generated according to a determination of a focus adjustment, to provide autofocus control. The focusing controller 42 may also be configured to receive a signal corresponding to the light received by the focus adjustment sensors 118, which may be used to determine an autofocus adjustment, such as by a focus adjustment determination unit 58. A mirror controller 46 can be configured to control the level of translucency of one or more components of a mirror assembly 132, such as at least one of the variable translucency mirror 110, the mirror windows 126 and the focus adjustment mirrors 128. That is, the mirror controller 46 may be configured to set the level of translucency of at least one of the components according to one or more signals received from the controller 50. The level of translucency may be set in response to a signal indicating that, for example, a mode has been switched with the mode selector switch 60 from a viewfinding mode to a display view mode, or vice versa, a phase-detection autofocus operation has been initiated (e.g., by half-depressing the shutter switch 64), and/or image capture has been initiated (e.g., by fully-depressing the shutter switch 64).

An exposure controller 40 can be configured to control at least one of the shutter 12 and control the size of the aperture(s) 11 to provide control of image exposure. The exposure controller 40 may also have a flash exposure compensation function that links with a flash 48 (e.g., a flash emission device). A zoom controller 44 may control the angle of view of the lens 10. According to one aspect, the exposure controller 40, focusing controller 42, and zoom controller 44 may each partially control the lens 10, aperture 11, and shutter 12, and they may also collaborate to calculate parameters for the lens 10, aperture 11, and shutter 12.

A memory 56 (as well as the memory 30) includes one or more computer readable and/or writable media, and may include, for example, a magnetic disk (e.g., a floppy disk, a hard disk), an optical disc (e.g., a CD, a DVD, a Blu-ray), a magneto-optical disk, a magnetic tape, semiconductor memory (e.g., a non-volatile memory card, flash memory, a solid state drive, SRAM, DRAM), an EEPROM, etc. The memory 56 may store computer-executable instructions and data for the operation of a controller 50. The controller 50 includes one or more processors (e.g., microprocessors) and reads and performs computer-executable instructions, such as instructions stored in the memory 56. Note that the computer-executable instructions may include those for the performance of various methods described herein. The memory 56 is an example of a non-transitory computer-readable medium that stores computer-executable instructions.

The memory 56 may include the focus adjustment determination unit 58 as at least one module thereof. A module includes computer-readable instructions that may be executed by one or more members of the image capture apparatus 100 to cause the apparatus 100 to perform certain operations, though for ease of description a module may be described as performing the operations. Modules may be implemented in software (e.g., JAVA, C, C++, C#, Basic, Assembly), firmware, and/or hardware. In other embodiments, the image capture apparatus 100 may include more modules and/or the module may be divided into more modules. The instructions in the focus adjustment determination unit 58 may be executed to cause the image capture apparatus 100 to determine a focus adjustment to be made based on light received by the one or more focus adjustment sensors 118, and to perform operations to implement the focus adjustment determined thereby via the focusing controller 42. That is, the focus adjustment determination unit 58 may be configured to calculate a focus adjustment that is suitable to focus an image based on analysis of the light received from the focus adjustment sensors 118, such as an adjustment to a focal length of the lens apparatus 13. Modules may be implemented in any applicable computer-readable storage medium that can be employed as a storage medium for supplying the computer-executable instructions. Furthermore, when the computer-executable instructions are executed, an operating system executing on the image capture apparatus 100 may perform at least part of the operations that implement the instructions.

The image capture apparatus 100 also includes the viewing mode changeover selector 60 that sets the operation mode of the image capture apparatus 100 to the viewfinder mode or display view mode. The viewing mode changeover selector 60 or another selector may also be used to set the image capture apparatus 100 to still image recording mode, video recording mode, playback mode, etc. A shutter switch 64 may be activated in the middle of operation (half-depressed) and generate a first shutter switch signal. Also, the shutter switch 64 may be activated upon a full stroke (fully-depressed) and generate a second shutter switch signal. The system controller 50 may start one or more operations (e.g., AF processing, AE processing, AWB processing, EF processing) in response to the first shutter switch signal. For example, the system controller 50 may start an autofocus operation in response to half-depression of the shutter switch 64. Also, in response to the second shutter switch signal, the system controller 50 may enter an image capture mode and perform and/or initiate one or more operations, including the following: reading image signals from the imaging sensor 14, converting image signals into image data by the A/D converter 16, processing of image data by the image processor 20, writing image data to the memory 30, reading image data from the memory 30, compression of the image data, and writing data to the recording medium 96.

A zoom selector 62 is operable by a user to change the angle of view (zooming magnification or shooting magnification). The zoom selector 62 may include, for example, a slide-type member, a lever, switch, a wheel, a knob, and/or a switch. Optionally, an image capture mode selector 67 may be provided to allow a user to select between modes for image capture, such as a first mode where a variable translucency mirror 110 is set to be fully transparent to allow for image capture, and a second mode where the variable translucency mirror 110 is moved out of the path of incident light to allow for image capture.

The operation unit 66 may include various buttons, touch panels and so on. In one embodiment, the operation unit 66 includes one or more of a menu button, a set button, a macro selection button, a multi-image reproduction/repaging button, a single-shot/serial shot/self-timer selection button, a forward (+) menu selection button, a backward (−) menu selection button, etc. The operation unit 66 may also set and change the flash operation mode. The settable modes include for example, auto, flash-on, red-eye reduction auto, and flash-on (red-eye reduction). The operation unit 66 may be used to select a storage format for the captured image information, including JPEG (Joint Photographic Expert Group) and RAW formats. The operation unit 66 may set the image capture apparatus 100 to a plural-image shooting mode, wherein a plurality of images is captured in response to a single shooting instruction (e.g., a signal from the shutter switch 64). This may include auto bracketing, wherein one or more image capturing parameters (e.g., white balance, exposure, aperture settings) are altered in each of the images. The operation unit 66 may also optionally be used allow a user to set various other modes, such as a still image recording mode, video recording mode, playback mode, etc.

A power supply controller 80 detects the existence/absence of a power source 82, the type of the power source, and a remaining battery power level, and supplies a necessary voltage and current to other components as required. The power source 82 includes a battery, such as an alkaline battery, a lithium battery, a NiCd battery, a NiMH battery, and Li battery, an AC adapter, a DC adapter, etc. According to one aspect, the power source 82 may be configured to act as at least one voltage supply to provide a voltage to at least one of the variable translucency mirror 110, mirror windows 126 and focus adjustment mirrors 128, in a response to a signal from the controller 50 and/or focusing controller 42. Alternatively, one or more separate voltage supplies 83a-83c may be provided that are controlled by the controller 50 and/or focusing controller 42 to set a translucency level.

The recording media 96 includes a recording unit 94 that comprises one or more computer-readable and/or computer-writable media. The image capture apparatus 100 and the recording media 96 communicate via an interface 90 of the system 100 and an interface 92 of the recording media. Although the illustrated embodiment of the image capture apparatus 100 includes one pair of interfaces 90, 92 and one recording media 96, other embodiments may include additional recording media and interfaces.

Furthermore, according to one aspect of the invention, the above described systems and methods can be achieved by supplying one or more storage media having stored thereon computer-executable instructions for realizing the above described operations to one or more devices that are configured to read the computer-executable instructions stored in the one or more storage media and execute them. In this case, the devices perform the operations of the above-described embodiments when executing the computer-executable instructions read from the one or more storage media. Also, an operating system on the one or more devices may implement the operations of the above described embodiments. Thus, the computer-executable instructions and/or the one or more storage media storing the computer-executable instructions therein constitute an embodiment.

Any applicable computer-readable storage medium (e.g., a magnetic disk (including a floppy disk and a hard disk), an optical disc (including a CD, a DVD, a Blu-ray disc), a magneto-optical disk, a magnetic tape, and a solid state drive (including flash memory, DRAM, SRAM) can be employed as a storage medium for the computer-executable instructions. The computer-executable instructions may be written to a computer-readable storage medium provided on a function-extension board inserted into the device or on a function-extension unit connected to the device, and a CPU provided on the function-extension board or unit may implement the operations of the above-described embodiments.

While the above disclosure describes illustrative embodiments, it is to be understood that the invention is not limited to the above disclosure. To the contrary, the invention covers various modifications and equivalent arrangements within the spirit and scope of the appended claims.

What is claimed is:

1. An image capture apparatus comprising:
a variable translucency mirror, the variable translucency mirror comprising:
a main mirror body having one or more apertures; and
one or more mirror windows disposed in the one or more of apertures;
a viewfinder unit configured to receive light reflected by the variable translucency mirror;
an imaging sensor configured to receive light transmitted through the variable translucency mirror;
an image display unit configured to display an image based on the light received by the imaging sensor; and
a controller configured to set a translucency of the variable translucency mirror,
wherein in a viewfinder mode, the controller sets the variable translucency mirror to be at least partially reflective such that light incident on the variable translucency mirror is reflected thereby and received by the viewfinder unit, and in a display view mode, the controller sets the variable translucency mirror to be at least partially transparent, such that light incident on the variable translucency mirror is transmitted therethrough and received by the imaging sensor.

2. The image capture apparatus according to claim 1, wherein the controller sets the variable translucency mirror to be fully reflective in the viewfinder mode, and the controller sets the variable translucency mirror to be fully transparent in the display view mode.

3. The image capture apparatus according to claim 1, wherein the variable translucency mirror comprises:
a transparent layer having a plurality of microblinds thereon comprising a reflective material, each microblind being configured to be selectively opened and/or closed by application of a voltage thereto, thereby varying the translucency of the variable translucency mirror.

4. The image capture apparatus according to claim 1, further comprising:
one or more focus adjustment mirrors configured to receive light transmitted through the one or more mirror windows of the variable translucency mirror window;
one or more focus adjustment sensors configured to receive light reflected by the one or more focus adjustment mirrors; and
a focus adjustment determination unit configured to determine a focus adjustment based on the light received by the one or more focus adjustment sensors.

5. The image capture apparatus according to claim 4, wherein at least one of the mirror windows and the focus adjustment mirrors has a fixed translucency.

6. The image capture apparatus according to claim 4, wherein the mirror windows are variable translucency mirror windows and the focus adjustment mirrors are variably translucency mirrors, and
wherein
in the viewfinder mode the controller sets the mirror windows to be at least partially transparent, such that at least a portion of the light incident on the mirror windows is transmitted therethrough, and the controller sets the focus adjustment mirrors to be fully reflective, such that light incident thereon is reflected thereby and received by the autofocus adjustment sensors, and
in the display view mode, the controller sets the mirror windows to be fully transparent such that light incident on the mirror windows is transmitted therethrough, and the controller sets the focus adjustment mirrors to be at least partially reflective, such that at least a portion of the light incident thereon is reflected thereby and received by the focus adjustment sensors, and at least a portion of the light incident thereon is transmitted therethrough and received by the imaging sensor.

7. The image capture apparatus according to claim 6 wherein, in an image capturing mode, the controller sets the variable translucency mirror, the mirror windows, and the focus adjustment mirrors to be fully transparent to transmit light therethrough to the imaging sensor.

8. The image capture apparatus according to claim 6 wherein the focus adjustment mirrors are configured to extend outwardly over the mirror windows at an angle with respect to a plane of the variable translucency mirror, and wherein the apparatus further comprises:
a first conductive transparent layer below the main mirror body that is in electrical contact therewith, the first conductive transparent layer having one or more apertures therein that are aligned with the apertures in the main variable translucency mirror;
a second conductive transparent layer below the first conductive transparent layer and extending through the apertures of the first conductive transparent layer to electrically contact the mirror windows;
a transparent first insulating layer between the first and second conductive transparent layers;
a transparent second insulating layer on the mirror body; and
a third conductive transparent layer over at least a portion of the transparent second insulating layer and extending to the focus adjustment mirrors to provide electrical contact therewith,
wherein the translucency of the main mirror body, the mirror windows, and the focus adjustment mirrors can be independently controlled via application of a voltage thereto via the first, second and third conductive transparent layers.

9. The image capture apparatus according to claim 8, wherein the first, second and third conductive transparent layers extend to an edge of the variable translucency mirror to allow for connection thereof to one or more voltage supplies.

10. The image capture apparatus according to claim 1, wherein the controller is configured to control a position of the variable translucency mirror, and wherein in the viewfinder and display view modes, the controller sets the position of the variable translucency mirror at a first position in a pathway of light directed towards the imaging sensor, and in an image capturing mode, the controller sets the position of the variable translucency mirror at a second position that is out of the pathway of the light directed towards the imaging sensor, such that the variable translucency mirror is moved from the first position in the viewfinder and display view modes to the second position in the image capturing mode.

11. A method for capturing an image in an image capturing apparatus comprising a variable translucency mirror having a main mirror body having one or more apertures and one or more mirror windows disposed in the one or more of apertures, a viewfinder unit configured to receive light reflected by the variable translucency mirror, an imaging sensor configured to receive light transmitted through the variable translucency mirror, and an image display unit configured to display an image based on the light received by the imaging sensor, the method comprising:

in a viewfinder mode, setting the variable translucency mirror to be at least partially reflective such that light incident on the variable translucency mirror is reflected thereby to be received by the viewfinder unit;

in a display view mode, setting the variable translucency mirror to be at least partially transparent, such that light incident on the variable translucency mirror is transmitted therethrough to be received by the imaging sensor;

in an image capturing mode, setting the variable translucency mirror to be fully transparent such that light incident on the variable translucency mirror is transmitted therethrough and received by the imaging sensor; and capturing the image while in the image capturing mode.

12. The method according to claim 11, wherein the variable translucency mirror comprises a transparent layer having a plurality of microblinds thereon comprising a reflective material, each microblind being configured to be selectively opened and/or closed by application of a voltage thereto, and the method further comprising applying a voltage to the microblinds to set the translucency of the variable translucency mirror in one or more of the viewfinder and display view modes.

13. The method according to claim 11, wherein the image capture apparatus further comprises one or more one or more focus adjustment mirrors configured to receive light transmitted through the one or more mirror windows of the variable translucency mirror window, and one or more focus adjustment sensors configured to receive light reflected by the one or more focus adjustment mirrors, the method further comprising:

determining a focus adjustment based on the light received by the one or more focus adjustment sensors.

14. The method according to claim 13, wherein at least one of the mirror windows and the focus adjustment mirrors has a fixed translucency.

15. The method according to claim 13, wherein the mirror windows and focus adjustment windows are variable translucency mirror windows, the method further comprising:

in the viewfinder mode, setting the mirror windows to be at least partially transparent, such that at least a portion of the light incident on the mirror windows is transmitted therethrough, and setting the focus adjustment mirrors to be fully reflective, such that light incident thereon is reflected thereby and received by the autofocus adjustment sensors, and in the display view mode, setting the mirror windows to be fully transparent such that light incident on the mirror windows is transmitted therethrough, and setting the focus adjustment mirrors to be at least partially reflective, such that at least a portion of the light incident thereon is reflected thereby and received by the focus adjustment sensors, and at least a portion of the light incident thereon is transmitted therethrough and received by the imaging sensor.

16. The method according to claim 13 comprising, in the image capturing mode, setting the variable translucency mirror, the mirror windows, and the focus adjustment mirrors to be fully transparent to transmit light therethrough to the imaging sensor.

17. The method according to claim 11 comprising, in the viewfinder and display view modes, setting the variable translucency mirror at a first position in a pathway of light directed towards the imaging sensor, and in an image capturing mode, moving the variable translucency mirror from the first position to a second position that is out of the pathway of the light directed towards the imaging sensor.

18. A non-transitory computer readable medium storing instructions that, when executed by one or more computer devices, cause the computing devices to perform operations for capturing an image in an image capturing apparatus comprising a variable translucency mirror having a main mirror body having one or more apertures and one or more mirror windows disposed in the one or more of apertures, a viewfinder unit configured to receive light reflected by the variable translucency mirror, an imaging sensor configured to receive light transmitted through the variable translucency mirror, and an image display unit configured to display an image based on the light received by the imaging sensor, the operations comprising:

in a viewfinder mode, setting the variable translucency mirror to be at least partially reflective such that light incident on the variable translucency mirror is reflected thereby to be received by the viewfinder unit;

in a display view mode, setting the variable translucency mirror to be at least partially transparent, such that light incident on the variable translucency mirror is transmitted therethrough to be received by the imaging sensor;

in an image capturing mode, setting the variable translucency mirror to be fully transparent such that light incident on the variable translucency mirror is transmitted therethrough and received by the imaging sensor; and capturing the image while in the image capturing mode.

19. A mirror for an image capture apparatus, the mirror comprising:

a main mirror body having a plurality of apertures; and a plurality of mirror windows disposed in the plurality of apertures, wherein at least one of the main mirror body and the plurality of mirror windows comprises a variable translucency member, the variable translucency member having a translucency that is variably set to provide a predetermined transmittance and reflectance of light incident thereon.

20. The mirror according to claim 19, wherein the main mirror body comprises a variable translucency mirror and the plurality of mirror windows comprise variable translucency windows, and wherein the main mirror body and the plurality of mirror windows are configured such that a translucency of the main mirror body is set independently of a translucency of the plurality of mirror windows.

21. The mirror according to claim 19, wherein the main mirror body comprises a variable translucency mirror having the plurality of apertures therein, and the plurality of mirror windows comprises a plurality of variably translucency mirror windows disposed in the plurality of apertures of the main mirror body, and further comprising:

a first conductive layer below the main mirror body that is in electrical contact therewith, the first conductive layer being transparent and having one or more apertures therein that are aligned with the plurality of apertures in the main mirror body;

a second conductive layer below the first conductive layer and extending through the apertures of the first conductive layer to electrically contact the mirror windrows, the second conductive layer being transparent;

a transparent first insulating layer between the first and second conductive layers;

a transparent second insulating layer on the main mirror body;

one or more secondary variable translucency mirrors extending at an angle from a plane of main mirror body, the secondary variable translucency mirrors being aligned with the mirror windows; and a third conductive layer extending over at least a portion of the second insulating layer and over the secondary variable translucency mirrors to provide electrical contact therewith, the third conductive layer being transparent, wherein the translucency of the main mirror body, the variable translucency mirror windows, and the secondary variable translucency mirrors can be independently controlled via application of a voltage thereto via the first, second and third conductive layers.

22. An image capture apparatus comprising the mirror of claim 19, and further comprising:
a controller configured to set the translucency of the variable translucency member by application of a voltage thereto.

23. An image capture apparatus comprising:
a variable translucency mirror having:
  a main mirror body having one or more apertures; and
  one or more mirror windows disposed in the one or more apertures;
a viewfinder unit configured to receive light reflected by the variable translucency mirror;
an imaging sensor configured to receive light transmitted through the variable translucency mirror;
one or more focus adjustment mirrors configured to receive light transmitted through the one or more mirror windows of the variable translucency mirror window;
one or more focus adjustment sensors configured to receive light reflected by the one or more focus adjustment mirrors;
an image display unit configured to display an image based on the light received by the imaging sensor;
a focus adjustment determination unit configured to determine a focus adjustment based on the light received by the one or more focus adjustment sensors; and
a controller configured to set a translucency of the variable translucency mirror,
wherein in a viewfinder mode, the controller sets the variable translucency mirror to be at least partially reflective such that light incident on the variable translucency mirror is reflected thereby and received by the viewfinder unit, and in a display view mode, the controller sets the variable translucency mirror to be at least partially transparent, such that light incident on the variable translucency mirror is transmitted therethrough and received by the imaging sensor.

24. The method according to claim 13, comprising determining the focus adjustment based on the light received by the one or more focus adjustment sensors while in the display view mode.

* * * * *